US009446430B2

(12) United States Patent
Mayr et al.

(10) Patent No.: US 9,446,430 B2
(45) Date of Patent: *Sep. 20, 2016

(54) BISPHENOL A AND AROMATIC GLYCIDYL ETHER-FREE COATINGS

(71) Applicant: Valspar Sourcing, Inc., Minneapolis, MN (US)

(72) Inventors: Peter Mayr, Laxenburg (AT); Paul Cooke, Singapore (SG); Trevor Fielding, Witney (GB); Ronald L. Goodwin, Pittsburgh, PA (US); Greg Paulson, Slippery Rock, PA (US); James Robinson, Pittsburgh, PA (US); Anthony Violleau, La Floresta (ES)

(73) Assignee: Valspar Sourcing, Inc., Minneapolis, MN (US)

( * ) Notice: Subject to any disclaimer, the term of this patent is extended or adjusted under 35 U.S.C. 154(b) by 185 days.

This patent is subject to a terminal disclaimer.

(21) Appl. No.: 14/201,026

(22) Filed: Mar. 7, 2014

(65) Prior Publication Data

US 2014/0183089 A1 Jul. 3, 2014

Related U.S. Application Data

(63) Continuation of application No. 14/135,932, filed on Dec. 20, 2013, now abandoned, which is a continuation of application No. 13/476,400, filed on May 21, 2012, now Pat. No. 8,632,857, which is a continuation of application No. 13/051,283, filed on Mar. 18, 2011, now Pat. No. 8,197,904, which is a continuation of application No. 11/463,446, filed on Aug. 9, 2006, now Pat. No. 8,142,858.

(60) Provisional application No. 60/707,494, filed on Aug. 11, 2005.

(51) Int. Cl.

| B05D 1/36 | (2006.01) |
|---|---|
| B05D 3/02 | (2006.01) |
| C09D 133/02 | (2006.01) |
| B05D 7/00 | (2006.01) |
| C09D 5/10 | (2006.01) |
| C09D 167/00 | (2006.01) |
| B65D 25/14 | (2006.01) |
| C08L 61/00 | (2006.01) |

(52) U.S. Cl.
CPC .............. *B05D 7/53* (2013.01); *B05D 7/542* (2013.01); *B65D 25/14* (2013.01); *C09D 5/106* (2013.01); *C09D 167/00* (2013.01); *C08L 61/00* (2013.01); *Y10T 428/256* (2015.01); *Y10T 428/31511* (2015.04); *Y10T 428/31794* (2015.04); *Y10T 428/31797* (2015.04)

(58) Field of Classification Search
CPC ............ B05D 7/00; B05D 7/14; B05D 7/22; B05D 7/04

USPC ....... 206/524.6; 427/404, 402, 407; 220/660; 524/522

See application file for complete search history.

(56) References Cited

U.S. PATENT DOCUMENTS

| 3,231,393 A | 1/1966 | Downing et al. |
|---|---|---|
| 3,305,602 A | 2/1967 | Bromstead |
| 3,466,347 A | 9/1969 | Davis |
| 3,716,400 A | 2/1973 | Tryzna et al. |
| 4,497,837 A | 2/1985 | Oswald |
| 4,623,565 A | 11/1986 | Huybrechts et al. |
| 5,229,214 A | 7/1993 | Maze et al. |
| 5,514,433 A | 5/1996 | Cole |
| 5,716,678 A | 2/1998 | Rockrath et al. |
| 6,472,480 B1 | 10/2002 | Anderson |
| 6,787,188 B1 | 9/2004 | Metcalfe |
| 6,916,874 B2 | 7/2005 | Mazza et al. |
| 7,682,674 B2 | 3/2010 | Vogt et al. |
| 8,142,858 B2 | 3/2012 | Cooke et al. |
| 2002/0114940 A1 | 8/2002 | Clemens et al. |
| 2004/0063851 A1 | 4/2004 | Neppl et al. |

(Continued)

FOREIGN PATENT DOCUMENTS

| EP | 0538774 A2 | 4/1993 |
|---|---|---|
| EP | 1035182 A1 | 9/2000 |
| WO | 9837159 A1 | 8/1998 |

(Continued)

OTHER PUBLICATIONS

PCT International Search Report dated Feb. 6, 2007 for International Application No. PCT/US2006/031099 filed Aug. 9, 2006 (3 pages).
European Search Report for corresponding foreign application EP 09180866.7-2102/2189281 dated May 28, 2010 (4 pages).
Notice of Opposition to Patent No. EP1945453, Application No. EP06801079.2 by PPG Industries, Inc. dated Sep. 30, 2010 (5 pages).
Annex I to Opposition Against EP 1,945,453 B, Grounds, Facts and Arguments on behalf of Opponent PPG Industries, Inc. (7 pages).
Opposition to Patent No. EP1945453, Application No. EP06801079.2 by Grace Darex Packaging Technologies dated Sep. 29, 2010 (11 pages).
"Fourth International Tinplate Conference"; syllabus; held in London Oct. 10-14, 1988; The International Tin Research Institute; I.T.R.I Publication No. 703 (15 pages).

(Continued)

*Primary Examiner* — James J Seidleck
*Assistant Examiner* — Deve E Valdez

(57) ABSTRACT

Disclosed are Bisphenol A (BPA), Bisphenol F, Bisphenol A diglycidyl ether (BADGE), and Bisphenol F diglycidyl ether (BFDGE)-free coating compositions for metal substrates including an under-coat composition containing a polyester (co)polymer, and an under-coat cross-linker; and an over-coat composition containing a poly(vinyl chloride) (co) polymer dispersed in a substantially nonaqueous carrier liquid, an over-coat cross-linker, and a functional (meth) acrylic (co)polymer. Also provided is a method of coating a metal substrate using the BPA, BPF, BADGE and BFDGE-free coating system to produce a hardened protective coating useful in fabricating metal storage containers. The coated substrate is particularly useful in fabricating multi-part foodstuffs storage containers with "easy-open" end closures.

14 Claims, No Drawings

(56) References Cited

U.S. PATENT DOCUMENTS

2005/0014012 A1 1/2005 Stapperfenne et al.
2010/0247827 A1 9/2010 Mayr et al.

FOREIGN PATENT DOCUMENTS

| WO | 9841588 | A1 | 9/1998 |
|---|---|---|---|
| WO | 0055265 | A1 | 9/2000 |
| WO | 03022944 | A1 | 3/2003 |
| WO | 03068415 | A1 | 8/2003 |
| WO | 2005080517 | A1 | 9/2005 |

OTHER PUBLICATIONS

Lyons, Gwynne; "Bisphenol A, A Known Endocrine Disruptor"; A WWF European Toxics Programme Report; Apr. 2000 (37 pages).
Howe, Susan R., et al; "Potential Exposure to Bisphenol A from Food-Contact Use of Epoxy Coated Cans"; Journal of Coatings Technology, Feb. 1998, vol. 70, No. 877, pp. 69-74 (6 pages).
Kinera products, Website extract, PolyOne Geon 170 Series, found at http://www.kinera.no/geon170.html (2 pages).
Kinera products, Website extract, PolyOne Paste PVC, found at http://www.kinera.no/paste_pvc.html (2 pages).
Exxonmobil, Product information for Solvesso™ 150 (1 page).
Zorll, Urich, et al.; "Rompp Lexikon Lacke and Druckfarben;" Georg Thiem Verlag, 1998 (4 pages).
DSM, "Product Data Uralac ZW 5897 SH", 2005 (1 page).
DSM, "Product Data Uralac SN859 S2G3-50", 2001 (1 page).
DSM, "Product Data Uralac SC890 S2G3-50", 2003 (2 pages).
DSM, "Product Data Uralac XP9051 SN", 1998 (2 pages).
Degussa AG, "Product Data Dynapol L 952", Jul. 18, 2002 (1 page).
Degussa AG, "Product Data Dynapol LH 818-05", Jul. 22, 2002 (1 page).
Degussa AG, "Product Data Dynapol L 651", Jul. 22, 2002 (2 pages).
Degussa AG, "Haftharz 2220", Aug. 1, 2002 (2 pages).
Huls Aktiengesellschaft, "Produktinformation Haftharz 2220", 1995 (2 pages).
Darex Container Products, "Product information sheet PR 1159-01", Aug. 18, 1998 (1 page).
Oldring, Peter K.T., et al., Packaging Materials 7. Metal Packaging for Foodstuffs, International Life Sciences Institute, Sep. 2007, D/2007/10.996/7, ISBN 90-78637-06-6, Belgium (44 pages).
Rebuttal Brief dated Jan. 4, 2012, filed by Grace Darex Packaging Technologies in opposition proceedings for Patent No. EP1945453, Application No. EP06801079.2 (6 pages).
Reply Brief, including, Annex dated Sep. 28, 2011, filed by Valspar in opposition proceedings for Patent No. EP1945453, Application No. EP06801079.2 (17 pages).
Summons to attend oral proceedings dated Jun. 11, 2013 in opposition proceedings for Patent No. EP1945453, Application No. EP06801079 (6 pages).
Opposition to Patent No. EP2189281, Application No. EP09180866.7 by W.R. Grace and Co-Conn dated Feb. 13, 2014 (16 pages).
Annex I to Opposition Against EP2189281, Grounds, Facts and Arguments on behalf of Opponent PPG Industries, Inc. dated Feb. 13, 2014 (11 pages).
Lyons, Gwynne "Bisphenol A, A Known Endocrine Disruptor", Apr. 2000. (37 pages).
Howe. Susan R. et al, "Potential Exposure to Bisphenol A from Food-Contact Use of Epoxy Coated Cans", Journal of Coatings Technology, vol. 70, No. 877, Feb. 1998. (6 pages).
Kinera products, Website extract, relating to "Geon 178". (4 pages).
Brief dated Apr. 15, 2014, filed by Grace Darex Packaging Techonologies in opposition proceedings for EP Patent No. 1945453. (6 pages).
Reply Brief dated Apr. 24, 2014, filed by the Patent Owner in response to the preliminary opinion of the EP Opposition Division and to the opposition letter from Opponent 1 dated Jan. 12, 2014, in opposition proceedings for EP Patent No. 1945453. (6 pages).
Minutes of the Oral Hearing and Decision of the Opposition Division dated Jun. 17, 2014, in opposition proceedings for EP Patent No. 1945453. (13 pages).
Opposition Appeal Brief dated Oct. 15, 2014, filed by Grace Darex Packaging Techonologies in opposition proceedings for EP Patent No. 1945453. (14 pages).
Opposition Appeal Brief dated Oct. 10, 2014, filed by PPG Industries in opposition proceedings for EP Patent No. 1945453. (4 pages).
Reply Brief dated Nov. 3, 2014, filed by the Patent Owner in response to the opposition briefs filed by Grace Darex Packaging Techonologies and PPG Industries in opposition proceedings for EP Patent No. 2189281. (16 pages).
Reply Brief dated Apr. 30, 2015, filed by the Patent Owner in response to the grounds of appeals filed by Grace Darex Packaging (opponent 1) and PPG Industries (opponent 2) in opposition proceedings for EP Patent No. 1945453. (40 pages).
Preliminary opinion of the European Opposition Board dated Jul. 29, 2015 in the opposition proceeding for EP Patent No. 2189281. (5 pages).
Response brief dated Oct. 14, 2015, filed by W.R. Grace & Co., in opposition proceedings for EP Patent No. 2189281. (11 pages).
Annex 1 to Opposition against EP Patent No. 1957579 B1, Facts and Arguments, filed Mar. 17, 2016. (19 pages).
Durez Corporation, Material Safety Data Sheet of Durez 33163, issued Jul. 16, 2010. (10 pages).
Reichhold Chemie Ges, m.b.h., Material Safety Data Sheet of Varcum 2227-B-40, printed Mar. 26, 2001. (6 pages).
further Written Submissions dated 22 Jul. 2016, filed by PPG Industries, Inc., in opposition proceedings for EP Patent No. 2189281. (14 pages).

BISPHENOL A AND AROMATIC GLYCIDYL ETHER-FREE COATINGS

CROSS REFERENCE TO RELATED APPLICATION(S)

This application is a continuation of U.S. application Ser. No. 14/135,932 filed on Dec. 20, 2013, which is a continuation of U.S. application Ser. No. 13/476,400 filed on May 21, 2012 (now U.S. Pat. No. 8,632,857) which is a continuation of U.S. application Ser. No. 13/051,283 filed on Mar. 18, 2011 (now U.S. Pat. No. 8,197,904), which is a continuation application of U.S. application Ser. No. 11/463,446 filed on Aug. 9, 2006 (now U.S. Pat. No. 8,142,858), which itself claims the benefit of Provisional Application No. 60/707,494 filed on Aug. 11, 2005 by Mayr, et al., each of which is entitled "Bisphenol A and Aromatic Glycidyl Ether-Free Coatings," and each of which is incorporated herein by reference in its entirety.

TECHNICAL FIELD

The invention relates to protective coating compositions and methods for coating metal substrates useful in fabricating, for example, packaging containers. The invention also relates to foodstuffs packaging containers, particularly multi-part containers with "easy-open" end closures, having an interior surface coated with such protective coatings.

BACKGROUND

Protective coatings are applied to the interior of metal food and beverage containers (e.g. cans) to prevent the contents from coming into contact with the metal surfaces of the containers. Contact of the container contents with the interior metal surface, especially where acidic products such as soft drinks and tomato juice are involved, can lead to corrosion of the metal container and result in contamination and deterioration of the contents. Protective coatings are also applied to the interior of food and beverage containers to prevent corrosion in the headspace of the container between the fill line of the food product and the container lid, which is particularly problematic with high salt content food products.

Metal container interiors are typically coated with a thin thermoset film to protect the interior metal surface from its contents. Various synthetic (co)polymer compositions and their blends, including poly(vinyl chloride) (co)polymers; vinyl-functional (meth)acrylic (co)polymers; polybutadiene (co)polymers; phenol-formaldehyde (co)polymers; epoxy-functional (co)polymers; alkyd/aminoplast resins and oleoresinous materials; have been used as interior can protective coatings. These heat-curable (co)polymer compositions are usually applied as solutions or dispersions in volatile organic solvents.

The heat-cured protective coating compositions generally should exhibit sufficient adhesion and flexibility to maintain film integrity during container fabrication. Sufficient coating adhesion and flexibility also are needed for the coating composition to withstand processing conditions the container is subject to during product packaging. Other desired performance features of the cured coatings include corrosion protection and sufficient chemical, abrasion and mar resistance. The coatings used on the interior of metal food containers preferably also meet government regulatory criteria. For food contact, the (co)polymeric and materials used in these coatings are typically derived from components acceptable to the U.S. Food and Drug Administration (FDA) as published in Title 21 of the Code of Federal Regulations, §175.300.

Multi-coat coating systems recently have been used to coat the interior of food and beverage containers, wherein the over-coat or lacquer contains an epoxy resin cross-linked with a phenolic resin. Such epoxy-based "Gold lacquers" typically exhibit good adhesion and are suitable for storing acidic foodstuffs and beverages. However, there is a perception that some epoxy-based coatings, containing mobile Bisphenol A (BPA), Bisphenol F (BPF), and aromatic glycidyl ether compounds, are less acceptable for foodstuffs storage.

Currently, the food packaging industry and consumer groups are seeking coated metal packaging articles prepared from coating compositions free from mobile BPA, BPF, and aromatic glycidyl ether compounds and exhibiting excellent corrosion and chemical resistance, acceptable adhesion and flexibility during container fabrication. The art continues to seek an ideal coating composition for use as a protective coating for metal foodstuffs containers.

SUMMARY OF THE INVENTION

The present invention is directed to hardenable, BPA, BPF, BADGE and BFDGE-free protective coating compositions for coating metal substrates. The present invention is also directed to protective coating compositions substantially free of mobile BPA, BPF and aromatic glycidyl ether compounds [e.g. Bisphenol A diglycidyl ether (BADGE), Bisphenol F diglycidyl ether (BFDGE) and optionally, Novolac glycidyl ether (NOGE)].

The present invention is also directed to methods useful in applying protective coatings to the interior lining of metal containers suitable for contact with foodstuffs. For example, an exemplary cured coating composition of the present invention demonstrates adequate chemical and physical properties for use as a protective coating system on the interior of metal containers used in packaging foods and beverages. The present invention is further directed to a metal storage container for foodstuffs in which the BPA, BPF, BADGE and BFDGE-free multi-coat protective coating composition is applied to an interior surface of the container.

One aspect of the present invention provides a hardenable packaging coating composition comprising an under-coat composition containing a polyester (co)polymer and an under-coat cross-linker; and an over-coat composition containing a poly(vinyl chloride) (co)polymer dispersed in a substantially nonaqueous over-coat carrier liquid, an over-coat cross-linker, and a functional (meth)acrylic (co)polymer; wherein the packaging coating composition is substantially free of mobile BPA, BPF, BADGE and BFDGE. In a presently preferred embodiment, the over-coat composition is completely free of BPA, BPF, BADGE and BFDGE.

In certain presently preferred embodiments, the under-coat cross-linker and/or over-coat cross-linker contain two or more functional groups selected from hydroxyl, amino, vinyl and blocked-isocyanate. In additional presently preferred embodiments, the functional (meth)acrylic (co)polymer contains one or more functional groups selected from hydroxyl, carboxyl, and oxirane. In a particularly preferred embodiment, at least one of the under-coat and over-coat compositions contains at least one of a PVC stabilizer or a pigment.

In another aspect, the present invention provides a method for coating a metal substrate with a hardenable multi-coat packaging composition wherein the hardened packaging composition is substantially free of mobile BPA, BPF, BADGE and BFDGE. The method includes the steps of applying an under-coat composition to a metal substrate, the under-coat composition containing a polyester (co)polymer and an under-coat cross-linker; applying an over-coat composition to the under-coated metal substrate, the over-coat composition containing a poly(vinyl chloride) (co)polymer dispersed in a substantially nonaqueous over-coat carrier liquid, an over-coat cross-linker and a functional (meth) acrylic (co)polymer; and curing the under-coat and over-coat compositions to provide a hardened film of the under-coat and over-coat composition on the metal substrate; wherein the hardened film is substantially free of mobile BPA, BPF, BADGE and BFDGE.

In another aspect of the present invention, a metal foodstuffs container is provided, wherein at least an interior surface of the container is coated with a hardened packaging coating composition according to the present invention. Preferably the metal foodstuffs container is a multi-part can having at least one easy-open end closure with at least an interior surface of the easy-open end closure coated with a hardened packaging coating composition according to the present invention.

The hardened packaging coating composition preferably maintains metal corrosion inhibition, imparts chemical resistance to acidic foodstuffs exposure, and achieves cured film integrity with good metal substrate and inter-coat adhesion and flexibility sufficient for container fabrication. In certain preferred embodiments, the hardened coating composition also stabilizes PVC-based organosols with respect to dehydrochlorination and/or scavenges hydrochloric acid, and is thus useful in providing improved resistance to acidic foodstuffs and in fabricating containers with "easy-open" end closures.

The details of one or more embodiments of the invention are set forth in the following Detailed Description of the Preferred Embodiments. These and other aspects, features and advantages of the present invention will become apparent from the Examples and the Claims, which follow thereafter.

DETAILED DESCRIPTION OF THE PREFERRED EMBODIMENTS

Definitions

As used herein, the term "aromatic glycidyl ether compounds" denotes compounds selected from the group consisting of Bisphenol A diglycidyl ether (BADGE) [2,2'-bis (4-hydroxyphenyl)propane bis(2,3-epoxypropyl)ether], Bisphenol F diglycidyl ether (BFDGE), and Novolac glycidyl ether (NOGE), and combinations thereof, in both the uncured and cured state.

The term "substantially free" of a particular mobile compound means that the compositions of the present invention contain less than 100 parts per million (ppm) of the recited mobile compound.

The term "essentially free" of a particular mobile compound means that the composition of the present invention contains less than five parts per million of the recited mobile compound.

The term "completely free" of a particular mobile compound means that the compositions of the present invention contain less than 20 parts per billion (ppb) of the recited mobile compound.

The term "mobile" means that the compound can be extracted from the cured coating when a coating (typically approximately 1 $mg/cm^2$ thick) is exposed to a ten weight percent ethanol solution for two hours at 121° C. followed by exposure for 10 days in the solution at 49° C.

If the aforementioned phrases are used without the term "mobile" (e.g., "substantially free of BPA, BPF, BADGE and BFDGE") then the compositions of the present invention contain less than the aforementioned amount of the compound whether the compound is mobile in the coating or bound to a constituent of the coating.

As used herein, the term "multi-coat coating system" is defined as a coating system requiring the application of at least two chemically distinct coating compositions to a particular substrate surface.

The term "two-coat coating system" is defined as a multi-coat coating system in which only two chemically distinct coating compositions are applied to a particular substrate surface.

The term "under-coat composition" is defined as the coating composition to be applied between a surface of a substrate and an "over-coat composition," and is synonymous with base-coat, primer or size for a two-coat system.

The term "over-coat composition" is defined as the coating composition to be applied over an applied under-coat composition, and is synonymous with top-coat or lacquer for a two-coat coating system.

The term "cured coating composition" is defined as the adherent (co)polymeric coating residing on a substrate resulting from at least partially curing or hardening a coating composition, for example, by film formation, cross-linking, and the like.

The term "coating solids" is defined as including all non-volatile materials that remain in the "cured coating composition" on the coated substrate after curing.

The term "(co)polymer" is defined as a macromolecular homopolymer derived from a single reactive entity (e.g. monomer) or a macromolecular copolymer derived from multiple reactive entities, or mixtures thereof.

Unless otherwise indicated, a reference to a "(meth) acrylate" compound (where "meth" is bracketed) is meant to include both acrylate and methacrylate compounds.

The term "dispersed in" with respect to a polymer "dispersed in" a carrier liquid means that the polymer can be mixed into a carrier liquid to form a macroscopically uniform, multiphase (e.g. solid/liquid) fluid mixture, and is intended to include mixtures wherein the carrier liquid solvates, swells or partially-solubilizes the dispersed polymer.

The term "substantially nonaqueous carrier liquid" is used to denote a carrier liquid in which water, if present at all, constitutes less than about five percent by weight of the carrier liquid.

The term "cross-linker" is used to denote a chemical compound containing two or more chemical groups (e.g. hydroxyl, carboxyl, vinyl and blocked isocyanate) capable of undergoing inter- or intra-molecular chemical reaction.

The term "functional (meth)acrylic (co)polymer" is used to denote a (meth)acrylic (co)polymer containing one or more polar chemical groups selected from hydroxyl, carboxyl and oxirane.

Coating Compositions

The present invention relates to hardenable coating compositions and protective coating systems for metal substrates including an under-coat composition containing (1) a polyester (co)polymer and an under-coat cross-linker and (2) an over-coat composition containing a poly(vinyl chloride) (co)polymer dispersed in a substantially nonaqueous carrier liquid, an over-coat cross-linker and a functional (meth) acrylic (co)polymer.

The hardenable coating compositions are preferably substantially free of mobile BPA, BPF, BADGE and BFDGE. More preferably, the coating compositions are essentially free of mobile BPA, BPF, BADGE and BFDGE. Most preferably, the coating compositions are completely free of BPA, BPF, BADGE and BFDGE. In presently preferred embodiments, the under-coat composition further contains a substantially nonaqueous under-coat carrier liquid, which need not be compositionally identical to the substantially nonaqueous over-coat carrier liquid.

Preferably, the polyester (co)polymer exhibits a hydroxyl number from about one to about 40 mg KOH per gram of polyester, and exhibits a glass transition temperature greater than about 50° C. Preferably the under-coat cross-linker and/or over-coat cross-linker is an aminoplast cross-linker containing at least two amino functional groups, a phenoloplast cross-linker containing at least two hydroxyl groups, a blocked-isocyanate cross-linker containing at least two blocked isocyanate groups, or a combination therof. Preferably the functional (meth)acrylic (co)polymer contains at least one functional group selected from carboxyl, hydroxyl and oxirane.

The multi-coat metal substrate protective coating compositions of the present invention are suitable for use as protective surface coatings in fabricating metal packages of tinplate, aluminum and tin-free steel. The multi-coat coating systems are suitable for both the interior and exterior coating of three-piece and deep-drawn metal foodstuff containers, but are particularly preferred for interior coating of foodstuff containers, where the coating contacts the foodstuff.

Also provided is a method of coating a metal substrate wherein the coating composition is substantially free of mobile BPA, BPF, BADGE and BFDGE. In presently preferred embodiments, a method of coating a metal substrate wherein the coating composition is completely free of BPA, BPF, BADGE, BFDGE and NOGE is provided. Further provided is a metal foodstuffs storage container derived from a metal substrate having at least one surface substantially coated with the hardened coating composition that is substantially free of mobile BPA, BPF, BADGE and BFDGE. The composite material is particularly useful in fabricating metal foodstuffs storage containers, including multi-part containers having "easy-open" end closures, wherein the hardened protective coating contacts the foodstuffs.

As described herein, the BPA, BPF, BADGE and BFDGE-free coating composition preferably includes an under-coat composition containing a polyester (co)polymer and an under-coat cross-linker capable of undergoing chemical cross-linking, preferably with the polyester (co)polymer.

The under-coat (i.e. base-coat, primer or size) coating composition preferably contains a polyester (co)polymer. A single polyester (co)polymer or a mixture of polyester (co)polymers may be used according to the present invention. The polyester (co)polymer or mixture of (co)polymers is preferably present in the under-coat coating composition in an amount from about 20 to about 99 percent, and more preferably about 60 to about 90 percent, by weight on a non-volatile solids basis.

The chemical composition of the polyester (co)polymer is not especially limited. However, it is preferred that the polyester (co)polymer be terminated at each end with a functional group. One skilled in the art understands that typical polyester terminal groups (e.g. hydroxyl or carboxyl groups) may, for example, be chemically reacted or exchanged to produce terminal amino-functional, amidofunctional, or urea-polyester (co)polymers using conventional chemical synthesis methods known in the art.

Preferably, the functional groups are chemically identical and are selected to be terminal hydroxyl or terminal carboxyl groups. The functional groups of the polyester (co) polymer are more preferably selected to be hydroxyl groups. The polyester (co)polymer is most preferably selected to exhibit a hydroxyl number from about one to about 40 mg KOH per gram of polyester (co)polymer on a non-volatile solids basis.

Preferably the polyester (co)polymer is a macromolecule exhibiting a number average molecular weight ($M_w$) from about 500 to about 10,000 Daltons, more preferably from about 1,000 to about 7,500 Da, and most preferably from about 3,000 to about 5,000 Da. The polyester (co)polymer preferably exhibits a glass transition temperature ($T_g$) greater than about 50° C., and more preferably greater than about 60° C. Preferably, the polyester (co)polymer exhibits a $T_g$ less than about 100° C., and more preferably less than about 90° C.

The polyester (co)polymer is typically prepared by condensation (esterification) according to known processes [see, for example, Zeno Wicks, Jr., Frank N. Jones and S. Peter Pappas, *Organic Coatings: Science and Technology*, Vol. 1, pp. 122-132 (John Wiley & Sons: New York, 1992)]. The polyester (co)polymer is usually derived from a mixture of at least one poly-functional alcohol (polyol) (generally a dihydroxy or trihydroxy alcohol) esterified with excess equivalents of a mixture of at least one dicarboxylic acid or anhydride (generally an aromatic dicarboxylic acid or anhydride).

The polyester (co)polymer is typically prepared from an aromatic or aliphatic polycarboxylic acid or anhydride, and an aromatic or aliphatic diol, triol, or polyol. The diol, polycarboxylic acid and/or anhydride are combined in suitable proportions and chemically reacted using standard esterification (condensation) procedures to provide a polyester having functional groups at the terminal ends of the polyester (co)polymer, which are preferably hydroxyl or carboxyl groups. Hydroxyl groups can be positioned at the terminal end of the polyester by utilizing excess diol, triol, or polyol in the reaction. A triol or polyol is used to provide a branched, as opposed to linear, polyester.

Examples of suitable polycarboxylic acids or anhydrides include, but are not limited to, maleic anhydride, maleic acid, fumaric acid, succinic anhydride, succinic acid, adipic acid, phthalic acid, phthalic anhydride, 5-terz-butyl isophthatic acid, tetrahydrophthalic anhydride, hexahydrophthalic anhydride, endomethylenetetrahydrophthalic anhydride, azelaic acid, sebacic acid, tetrachloro-phthalic anhydride, chlorendic acid, isophthalic acid, trimellitic anhydride, terephthalic acid, a naphthalene dicarboxylic acid, cyclohexane-dicarboxylic acid, glutaric acid, anhydrides and acids thereof, and mixtures thereof. It is also understood that an esterifiable derivative of a polycarboxylic acid, such as a dimethyl ester or anhydride of a polycarboxylic acid, can be used to prepare the polyester.

Customarily, dicarboxylic acids and their esterifiable derivatives are used. Examples of such compounds include phthalic acid, isophthalic acid, terephthalic acid, 1,4-cyclohexanedicarboxylic acid, succinic acid, sebacic acid, methyltetrahydrophthalic acid, methylhexahydrophthalic acid, tetrahydrophthalic acid, dodecanedioic acid, adipic acid, azelaic acid, naphthalenedicarboxylic acid, pyromellitic acid and/or dimer fatty acids, acid anhydrides thereof and/or lower alkyl esters, for example methyl esters. Tri-carboxylic acids (e.g. trimellitic acid) may also be used.

Preferred polycarboxylic acids and their esterifiable derivatives contain aromatic functionality. Examples of preferred aromatic dicarboxylic acids are phthalic acid, terephthalic acid, isophthalic acid and dimer fatty acid; trimellitic acid is a preferred aromatic tricarboxylic acid. Particularly preferred are terephthalic and isophthalic acid. The anhydride derivatives of these acids can also be used if they exist as anhydrides.

Preferably less than 10% by weight of the dicarboxylic acid content comprises other aliphatic polyfunctional carboxylic acids. Examples of other aliphatic polyfunctional carboxylic acids are malonic acid, succinic acid, glutaric acid, adipic acid, azelaic acid, suberic acid, sebacic acid, dimer fatty acids, maleic acid and dimer fatty acids. Hydroxy acids can also be included in the polyester such as, for example, 12-hydroxy stearic acid, lactic acid and 2-hydroxy butanoic acid.

Examples of suitable diols, triols, and polyols include, but are not limited to, ethylene glycol, propylene glycol, 1,3-propanediol, glycerol, diethylene glycol, dipropylene glycol, triethylene glycol, trimethylolpropane, trimethylolethane, tripropylene glycol, neopentyl glycol, pentaerythritol, 1,4-butanediol, trimethylol propane, hexylene glycol, cyclohexanedimethanol, a polyethylene or polypropylene glycol having a weight average molecular weight ($M_w$) of about 500 Da or less, isopropylidene bis (p-phenylene-oxypropanol-2), and mixtures thereof.

The polyol mixture may include at least one tri-hydroxy alcohol (e.g. triol), but is predominantly composed of one or more di-hydroxy alcohol (e.g. glycol or diol). Suitable tri-hydroxy alcohols include, for example, trimethylolethane, trimethylopropane, pentaerythritol, dipentaerythritol, glycerol, and mixtures thereof. Preferred triols are trimethylolethane and trimethylopropane. Suitable di-hydroxy alcohols include, for example, ethylene glycol, propylene glycol, 1,2- and/or 1,3-propanediol, diethylene glycol, dipropylene glycol, triethylene glycol, tetraethylene glycol, 1,4-butanediol, 1,3-butylethylpropanediol, 2-methyl-1,3-propanediol, 1,5-pentanediol, cyclohexanedimethanol, glycerol, 1,6-hexanediol, neopentyl glycol, pentaerythritol, trimethylolethane, trimethylolpropane, 1,4-benzyldimethanol and -ethanol, 2,4-dimethyl-2-ethylhexane-1,3-diol, and mixtures thereof. Most preferred are diols. Examples of preferred diols include ethylene glycol, propylene glycol, diethylene glycol, neopentyl glycol, and mixtures thereof.

As noted above, the polyester (co)polymer is preferably carboxyl-terminated or hydroxy-terminated, depending upon the stoichiometry of the esterification reaction mixture. To provide a hydroxy-terminated polyester, the equivalent excess of polyol over dicarboxylic acid should preferably be maintained from about 0.02 to about 0.784 on a molar basis, and more preferably from about 0.04 to about 0.554 on a molar basis. Similarly, to provide a carboxyl-terminated polyester, it is usually preferable to use a two-step process. First, one prepares a hydroxy-polyester, and then reacts the terminal hydroxyl groups with a molar excess of dicarboxylic acid. The equivalent excess of dicarboxylic acid over polyol generally should be maintained from about 0.02 to about 0.784 on a molar basis, and preferably from about 0.04 to about 0.554 on a molar basis. A modest amount (e.g. 1-5 percent by weight) of a tri-functional monomer (e.g. trimellitic anhydride) may be added to increase the number average carboxyl-functionality of the polyester (co)polymer.

Preferably, the polyester (co)polymer is hydroxy-terminated. In some embodiments, the hydroxyl number of the hydroxy-polyester (co)polymer ranges typically from about one to about 50 milligrams KOH/g (co)polymer, and preferably from about one to about 20 mg KOH/g (co)polymer. Alternatively, the polyester (co)polymer is carboxyl-terminated. The carboxyl-terminated polyesters typically exhibit an acid number (AN) of about one to about 50 mg KOH/g (co)polymer, and preferably from about one to about 20 mg KOH/g (co)polymer. Acid number may be determined using the titrimetric method described in ISO Standard XP-000892989. Hydroxyl number may be determined using the same standard test method, substituting a solution of hydrochloric acid in ethanol for the potassium hydroxide in ethanol titrant, and expressing the neutralization endpoint equivalents of hydrochloric acid in terms of the molar equivalents of potassium hydroxide.

Various commercially available polyester (co)polymers are suitable for use in the present invention. For example, VITEL® polyester (co)polymers (e.g. VITEL® PE-100 and PE-200 saturated polyester (co)polymers available from Goodyear Tire & Rubber Co., Akron, Ohio), URALAC™ polyester (co)polymers (e.g. URALAC ZW5000SH™ available from DSM Resins U.S., Inc., Augusta, Ga.), and Dynapol™ polyester (co)polymers (e.g. Oynapol™ L and LH saturated polyester resins available from Degussa, Corp., Parsippany, N.J.). Alternatively, polyester (co)polymers may be chemically synthesized using esterification-condensation methods known to those skilled in the all as previously described.

In preferred embodiments, the under-coat coating composition contains an under-coat cross-linker, preferably at from about 5 to about 30 percent by weight and more preferably from about 15 to about 25 percent by weight of the under-coat composition on a non-volatile solids basis (i.e. excluding optional solvents or carrier liquids). The under-coat cross-linker preferably contains two or more functional groups capable of undergoing chemical reaction with one or more of the polyester (co)polymer, the over-coat cross-linker, and/or the functional (meth)acrylic (co)polymer.

The choice of particular under-coat cross-linker typically depends on the particular product being formulated. For example, some coating compositions are highly colored (e.g., gold-colored coatings). These coatings may typically be formulated using cross-linkers that themselves tend to have a yellowish color. In contrast, white or clear coatings are generally formulated using non-yellowing cross-linkers, or only a small amount of a yellowing cross-linker. Preferred under-coat cross-linkers are at least substantially free of mobile BPA, BPF, BADGE and BFDGE.

The cross-linker may be any suitable compound including, for example, a single molecule, a dimer, an oligomer, a (co)polymer or a mixture thereof. Preferably, the cross-linker is a polymeric material and more preferably a (co)polymer. Any suitable amino-, hydroxyl-, vinyl- or isocyanate-functional cross-linkable (co)polymers can be used. For example, aminoplast and phenoplast (i.e. phenolic) cross-linkable (co)polymers, containing two or more active hydrogen (e.g. amino or hydroxyl) groups may be used. Alternatively, blocked isocyanate cross-linkers containing two or more blocked isocyanate groups, or an isocyanate group and a vinyl group, can be used in the under-coat.

Examples of cross-linkable aminoplast (co)polymers include the condensation products of aldehydes such as formaldehyde, acetaldehyde, crotonaldehyde, and benzaldehyde with amino- or amido-group-containing substances such as urea, melamine and benzoguanamine. Examples of suitable cross-linking aminoplast (co)polymers include, without limitation, (co)polymers containing two or more amino functional groups. Suitable aminoplast (co)polymer cross-linkers are commercially available, and include benzoguanamine-formaldehyde (co)polymers, melamine-formaldehyde (co)polymers, esterified melamine-formaldehyde (co)polymers, and urea-formadehyde (co)polymers. One specific example of a useful aminoplast cross-linker is the fully alkylated melamine-formaldehyde (co)polymer commercially available from Cytec Industries (Cytec Industries GMBH, Neuss, Germany) under the trade name of CYMEL 303.

Examples of cross-linkable phenoplast (co)polymers include the condensation products of aldehydes with phenols. Formaldehyde and acetaldehyde are preferred aldehydes. Various phenols can be employed such as phenol, cresol, p-phenylphenol, p-tert-butylphenol, p-tert-amylphenol, and cyclopentylphenol. Examples of suitable cross-linking phenoplast (i.e. phenolic) (co)polymers include (co)polymers containing two or more hydroxyl functional groups that preferably are substantially free of mobile BPA, BPF, BADGE and BFDGE.

Phenolic cross-linkers of the resole type may be used such as, for example, phenol, butylphenol, xylenol- and cresol-formaldehyde types, with the types specifically etherified with butanol being preferred for protective container coatings [see, for example, Zeno Wicks, Jr., Frank N. Jones and S. Peter Pappas, *Organic Coatings: Science and Technology*, Vol. 1, pp. 184-186 (John Wiley & Sons: New York, 1992)].

Suitable phenolic cross-linkers are commercially available. Examples of commercially available phenolic cross-linkers include those known by the tradenames DUREZ™ and VARCUM™ from DUREZ Corp. (Dallas, Tex.) or Reichhold Chemical AG (Austria); (CO)POLYMEROX™ from Monsanto Chemical Co. (St. Louis, Mo.); AROFENE™ and AROTAP™ from Ashland Chemical Co. (Dublin, Ohio); and BAKELITE™ from Bakelite A. G. (Iserlohn, Germany). Particularly preferred resole phenolic cross-linkers are BAKELITE PF 6470 LB™, BAKELITE 9989LB™, and VARCUM 2227 B 55™. Most preferably, one of the two particularly preferred BAKELITE™ phenolic resins may be used as a mixture in the under-coat coating composition with VARCUM 2227 B 55, generally at a weight ratio of between 1/3 to 3/1 of BAKELITE™ to VARCUM™ phenolic cross-linker.

In certain preferred embodiments, the under-coat cross-linker is selected to be a blocked isocyanate having two or more isocyanate functional groups, or an isocyanate group and a vinyl group, capable of cross-linking with at least one component of the coating composition. Preferably, the blocked isocyanate is an aliphatic and/or cycloaliphatic blocked polyisocyanate such as, for example, HDI (hexamethylene diisocyanate), IPDI (isophorone diisocyanate), TMXDI (bis[4-isocyanatocyclohexyl]methane), $H_{12}$MDI (tetramethylene-m-xylidene diisocyanate), TMI (isoprope-nyldimethyl-benzylisocyanate), dimers or trimers thereof, and combinations thereof. Preferred blocking agents include, for example, n-butanone oxime, ε-caprolactam, diethyl malonate, and secondary amines.

Suitable commercially available blocked isocyanate cross-linkers include, for example, VESTANAT™ B 1358 A, VESTANAT™ EP B 1186 A, VESTANAT™ EP B 1299 SV (all available from Degussa Corp., Marl, Germany) and DESMODUR™ BL 3175 (available from Bayer A. G., Leverkusen, Germany).

As described herein, the inventive coating composition preferably includes an over-coat composition containing a poly(vinyl chloride) (co)polymer dispersed in a substantially nonaqueous over-coat carrier liquid, an over-coat cross-linker, and a functional (meth)acrylic (co)polymer.

In preferred embodiments, the over-coat composition comprises a poly(vinyl chloride) (co)polymer dispersed in a substantially nonaqueous carrier liquid to form an organosol. A PVC organosol is a dispersion of finely divided PVC (co)polymer particles dispersed in a carrier liquid preferably chosen so as to dissolve the PVC (co)polymer to only a minor extent or not at all. Useful PVC (co)polymer may be in the form of finely divided polyvinyl chloride (co)polymer powder commercially available from a number of sources. In some embodiments, the PVC (co)polymer powder exhibits a volume average particle diameter of from about 0.5 to about 30 micrometers.

Suitable commercially available PVC (co)polymer powders include, for example, Geon™ (available from PolyOne Corp., Pasadena, Tex.) and Vinnol (available from Wacker Chemie; Munich, Germany) poly(vinyl chloride) homopolymers and poly(vinyl chloride)-co-poly(vinyl acetate) (co)polymers. Preferably, the PVC powder is a PVC homopolymer such as Geon 171™ or Geon 178™ (available from PolyOne Corp., Pasadena, Tex.).

Preferred over-coat coating compositions comprise from about 40 to about 90 percent by weight, and more preferably from about 60 to about 85 percent by weight of PVC, based on the total non-volatile weight of the over-coat coating composition. The PVC is preferably added to the over-coat coating composition by what is known as a media grinding or milling process using a ball mill, bead mill, sand mill or other similar media mill.

The over-coat coating composition preferably includes an over-coat carrier liquid to effectively deliver the PVC (co)polymer powder dispersion to the substrate. The over-coat carrier liquid is preferably substantially nonaqueous. It should be understood that a substantially nonaqueous coating composition can include a relatively low amount of water, such as up to about five percent by total weight of the over-coat coating composition, without adversely affecting the metal corrosion-inhibiting properties of the over-coat coating composition, either prior to or after curing. The water can be added to the composition intentionally, or can be present in the composition inadvertently, such as when water is present in a particular component included in the coating composition.

Substantially nonaqueous organic solvents or organic solvent blends may be used advantageously as the over-coat carrier liquid, for example, to obtain more favorable coating rheology, to achieve faster drying or cure times, or to effectively dissolve or solvate another component of the over-coat composition (e.g. the over-coat cross-linker or the functional (meth)acrylic copolymer).

Preferably, the substantially nonaqueous carrier liquid has sufficient volatility to evaporate essentially entirely from the coating composition during the curing process, such as during heating at about 176° C. to about 205° C. for about 8 to about 12 minutes. Suitable substantially nonaqueous carriers are known in the art, and include, for example, aliphatic hydrocarbons like mineral spirits, kerosene, and high flash varnish makers and painters (VM&P) naphtha; aromatic hydrocarbons, like toluene, benzene, xylene and blends thereof (e.g. Aromatic Solvent 100); alcohols, like isopropyl alcohol, n-butyl alcohol, and ethyl alcohol; ketones, like cyclohexanone, ethyl aryl ketones, methyl aryl ketones, and methyl isoamyl ketone; esters, like alkyl acetates (e.g. ethyl acetate and butyl acetate); glycol ethers like ethylene glycol monomethyl ether, ethylene glycol monoethyl ether, ethylene glycol monobutyl ether (e.g. glycol ether EB), and propylene glycol monomethyl ether; glycol ether esters, like propylene glycol monomethyl ether acetate; aprotic solvents, like tetrahydrofuran; chlorinated solvents; mixtures of these solvents and the like.

The amount of substantially nonaqueous carrier included in the composition is limited only by the desired, or necessary, rheological properties of the composition. Usually, a sufficient amount of substantially nonaqueous carrier is included in the coating composition to provide a composition that can be processed easily and that can be applied to a metal substrate easily and uniformly, and that is sufficiently removed from the coating composition during curing within the desired cure time.

Therefore, essentially any substantially nonaqueous carrier is useful in the present coating composition as long as the substantially nonaqueous carrier adequately disperses and/or solubilizes the composition components; is inert with respect to interacting with composition components; does not adversely affect the stability of the coating composition or the ability of the corrosion-inhibition coating to inhibit corrosion of a metal substrate, and evaporates quickly, essentially entirely, and relatively rapidly to provide a cured coating composition that inhibits the corrosion of a metal substrate, demonstrates good adhesion and flexibility, and has good chemical and physical properties.

In preferred embodiments, the over-coat coating composition contains an over-coat cross-linker, preferably at from about 5 to about 30 percent by weight and more preferably at from about 6 to about 25 percent by weight of the under-coat composition on a non-volatile solids basis. The over-coat cross-linker preferably contains at least two functional groups capable of undergoing chemical reaction with one or more of the polyester (co)polymer, the under-coat cross-linker, the over-coat cross-linker, and/or the functional (meth)acrylic copolymer.

The choice of particular over-coat cross-linker typically depends on the particular product being formulated. For example, some coating compositions are highly colored (e.g., gold-colored coatings). These coatings may typically be formulated using cross-linkers that tend to have a yellowish color. In contrast, white or clear coatings are generally formulated using non-yellowing cross-linkers, or only a small amount of a yellowing cross-linker. Preferred cross-linkers are substantially free of mobile BPA, BPF, BADGE and BFDGE.

Any suitable hydroxyl-, amino-, vinyl- or isocyanate-functional cross-linkers can be included in the over-coat coating composition. For example, phenoplast (i.e. phenolic), aminoplast, and blocked isocyanate cross-linkers may be used. The cross-linker may be in a variety of forms, including, for example, a monomer, a dimer, a trimer, an oligomer, a polymer or a (co)polymer. Preferably, the cross-linker is a polymeric material, more preferably a (co)polymer.

Examples of suitable cross-linkable aminoplast (co)polymers for use in the over-coat coating composition include, without limitation: benzoguanamine-formaldehyde (co)polymers, melamine-formaldehyde (co)polymers, esterified melamine-formaldehyde (co)polymers, and urea-formadehyde (co)polymers. One specific example of a useful aminoplast cross-linker is CYMEL 303 (Cytec Industries, Neuss, Germany).

Preferably, the over-coat cross-linker is a phenolic (i.e. phenoplast) (co)polymer. The preferred phenolic cross-linker contains at least two terminal hydroxyl groups capable of undergoing chemical reaction with at least one or more of the polyester (co)polymer, the over-coat phenolic (co)polymer, and/or the functional (meth)acrylic copolymer, thereby effecting cross-linking within the under-coat and/or between the under-coat and the over-coat.

Suitable phenolic cross-linkers for use in the over-coat coating composition are commercially available. Examples of commercially available phenolic cross-linkers include those described above for the under-coat coating composition.

The over-coat cross-linker may be selected to be a blocked isocyanate having two or more isocyanate functional groups, or an isocyanate group and a vinyl group, capable of cross-linking with at least one component of the coating composition. The blocked isocyanate may be an aliphatic and/or cycloaliphatic blocked polyisocyanate, for example HDI (hexamethylene diisocyanate), IPDI (isophorone diisocyanate), TMXDI (tetramethylene-m-xylidene diisocyanate), $H_{12}$MDI (bis[4-isocyanatocyclohexyl]methane), TMI (isopropenyldimethyl-benzylisocyanate), mixtures thereof, and dimers or trimers thereof. Preferred blocking agents include, for example, n-butanone oxime, ϵ-caprolactam, diethyl malonate, and secondary amines.

Suitable commercially available blocked isocyanate cross-linkers include, for example, VESTANAT™ B 1358 A, VESTANAT™ EP B 1186 A, VESTANAT™ EP B 1299 SV (all available from Degussa Corp., Marl, Germany) and DESMODUR™ BL 3175 (available from Bayer A. G., Leverkusen, Germany).

The over-coat composition also preferably contains a functional (meth)acrylic (co)polymer (e.g., a carboxy-functional, hydroxy-functional, or oxirane-functional (meth)acrylic (co)polymer). In a preferred embodiment, the functional (meth)acrylic (co)polymer is formed from at least one functional, ethylenically unsaturated monomer or oligomer (e.g., a carboxyl-functional, hydroxyl-functional or oxirane-functional vinyl monomer or oligomer) that is reacted with other ethylenically unsaturated (e.g. vinyl (meth)acrylic) co-monomers to form the functional (meth)acrylic (co)polymer. The functional (meth)acrylic (co)polymer is preferably present in the over-coat composition in an amount from about 2.5 to about 30 percent by weight, more preferably from about 5 to about 20 percent, and most preferably from about 7.5 to 18 percent by weight of the over-coat composition on a non-volatile solids basis.

The functional (meth)acrylic (co)polymer may have a weight average molecular weight ($M_w$) from about 1,000 to about 50,000 Daltons (Da), more preferably from about 2,000 to about 25,000 Da, and most preferably from about 5,000 to about 10,000 Da. The glass transition temperature of the functional (meth)acrylic (co)polymer preferably ranges from about −24° C. to about 105° C., and more preferably ranges from about 50° C. to about 90° C.

The functional (meth)acrylic (co)polymer preferably is capable of undergoing cross-linking with one or more of the over-coat cross-linker, the under-coat cross-linker, and/or the polyester (co)polymer. More preferably, the functional (meth)acrylic (co)polymer is a (co)polymer containing one or more functional groups selected from carboxyl, hydroxyl and oxirane. Most preferred functional (meth)acrylic (co) polymers contain at least one carboxyl group or one oxirane functional group, optionally in combination with one or more hydroxyl groups.

Preferably, the functional (meth)acrylic (co)polymer is a copolymer of methacrylic acid (MA) and acrylic acid (AA) with ethyl methacrylate and butyl methacrylate; a copolymer of 2-hydroxyethylmethacrylate (HEMA) with ethyl methacrylate; a copolymer of glycidyl methacrylate (GMA) with ethyl methacrylate, or a copolymer of glycidyl methacrylate with hydroxypropylmethacrylate and styrene. Preferably, the MA, AA or HEMA are present in the (co)polymer at from about 0.5 to about 10 percent, more preferably from about 1 to about 7.5 percent, and most preferably from about 2 to about 5 percent by weight of the (co)polymer on a dry solids basis. Preferably, the GMA is present in the (co)polymer at from about 0.5 to about 40 percent, more preferably from about 10 to about 25 percent, and most preferably from about 15 to about 20 percent by weight of the (co)polymer on a dry solids basis.

The functional (meth)acrylic (co)polymer preferably is chemically synthesized using suitable polymerization methods. Chemical synthesis is preferred in order to control the chemical and physical properties (e.g., molecular weight, glass transition temperature, acid number, and the like) of the functional (meth)acrylic (co)polymer. Preferred chemical synthesis methods involve polymerization of ethylenically unsaturated monomers (e.g. by free radical polymerization).

Suitable carboxyl-functional (meth)acrylic (co)polymers include poly-acid or poly-anhydride polymers. Examples of such polymers include (co)polymers prepared from ethylenically unsaturated acid or anhydride monomers (e.g., carboxylic acid or carboxylic anhydride monomers) and other ethylenically unsaturated co-monomers (e.g., vinyl-functional co-monomers, particularly (meth)acrylic co-monomers).

A variety of carboxyl-functional and anhydride-functional monomers may be used; their selection is dependent on the desired final carboxyl-functional (meth)acrylic (co)polymer properties. Suitable ethylenically unsaturated carboxyl-functional monomers and anhydride-functional monomers for the present invention include monomers having a reactive carbon-carbon double bond and an acidic or anhydride group. Preferred such monomers have from 3 to 20 carbons, 1 to 4 sites of unsaturation, and from 1 to 5 acid or anhydride groups or salts thereof. Methacrylic acid and acrylic acid are particularly preferred carboxyl-functional monomers.

Suitable hydroxyl-functional (meth)acrylic (co)polymers include those obtained by polymerization of a hydroxyl-functional, ethylenically unsaturated monomer with other ethylenically unsaturated co-monomers (e.g., vinyl-functional co-monomers, particularly (meth)acrylic co-monomers). Preferred hydroxyl-functional monomers have from 3 to 20 carbons, 1 to 4 sites of unsaturation, and from 1 to 5 hydroxyl groups. Specific examples of monomers containing a hydroxyl group are the hydroxy ($C_1$-$C_6$) alkyl (meth)acrylates such as, for example, 2-hydroxyethyl methacrylate, 2-hydroxyethyl acrylate, 2-hydroxypropyl methacrylate, and 3-hydroxypropyl methacrylate.

Examples of suitable oxirane-functional (meth)acrylic (co)polymers include acrylate, methacrylate, and/or vinyl polymers and copolymers having oxirane functional groups (including, e.g., (meth)acrylate copolymers having pendant glycidyl groups). In one embodiment, the oxirane-functional (meth)acrylic (co)polymer is formed by reacting one or more oxirane-functional monomers, optional hydroxy-functional monomers, and one or more other monomers (e.g., non-functional monomers). Preferred oxirane-functional (meth)acrylic (co)polymers utilized in this invention include those prepared by conventional free radical polymerization of from about 0.5 to about 40, more preferably from about 10 to about 25, and most preferably from about 15 to about 20 percent by weight of the unsaturated oxirane-functional monomer with the balance other ethylenically unsaturated co-monomers.

Specific examples of suitable oxirane-functional monomers containing a glycidyl group are glycidyl (meth)acrylate (i.e., glycidyl methacrylate and glycidyl acrylate), mono- and di-glycidyl itaconate, mono- and di-glycidyl maleate, and mono- and di-glycidyl formate. It also is envisioned that allyl glycidyl ether and vinyl glycidyl ether can be used as the oxirane-functional monomer. A preferred monomer is glycidyl methacrylate ("GMA")

The choice of the ethylenically unsaturated co-monomer (s) is dictated by the intended end use of the coating composition and is practically unlimited. Suitable ethylenically unsaturated hydroxyl-functional monomers for the present invention include monomers having a reactive carbon-carbon double bond and a hydroxyl group. Examples of suitable alkyl (meth)acrylate esters include, but are not limited to, methyl, ethyl, propyl, isopropyl, butyl, isobutyl, pentyl, isoamyl, hexyl, 2-ethylhexyl, octyl, nonyl. decyl, isodecyl, lauryl, and isobornyl (meth)acrylates. Aromatic (meth)acrylate ester co-monomers (e.g. cyclohexyl and benzyl (meth)acrylate) may also be used. Preferred (meth) acrylic esters are the methyl and ethyl esters of methacrylic acid or mixtures of such esters.

Optional mono unsaturated monomers suitable for copolymerizing with the co-monomer containing a functional group include, but are not limited to, vinyl monomers, like styrene, a halostyrene, isoprene, diallylphthalate, divinylbenzene, conjugated butadiene, α-methylstyrene, vinyl toluene, vinyl naphthalene, and mixtures thereof. Other suitable polymerizable vinyl co-monomers include acrylonitrile, acrylamide, methacrylamide, methacrylonitrile, vinyl acetate, vinyl propionate, vinyl butyrate, vinyl stearate, isobutoxymethyl acrylamide, and the like, and mixtures thereof.

A catalyst or polymerization initiator is ordinarily used in the polymerization of the carboxyl-functional (meth)acrylic (co)polymers, in suitable amounts. For example, this can be virtually any free radical initiator that is sufficiently soluble in the co-monomer mixture and optional carrier liquid to undergo decomposition to form radicals when heated to a temperature at or above its decomposition temperature. For example, azoalkanes, peroxides, tertiary butyl perbenzoate, tertiary butyl peroxypivalate, and tertiary butyl peroxyisobutyrate are suitable. Preferred initiators include azobis-isobutyronitrile (Trigonox B, Atofina Chemical Co.) and benzoyl peroxide.

The types of coating compositions that are found to be most effective in the present invention are those that combine a polyester (co)polymer with an under-coat cross-linker in an under-coat composition; and a PVC (co)polymer dispersion in a substantially nonaqueous over-coat carrier liquid with an over-coat cross-linker and a functional (meth) acrylic (co)polymer. An under-coat carrier liquid is thus not an essential ingredient of the under-coat composition. If an optional under-coat carrier liquid is used, it is typically a substantially nonaqueous organic solvent or solvent blend to affect more rapid removal of the carrier liquid and more rapid curing of the under-coat composition upon application to the substrate.

A substantially nonaqueous organic solvent can include a relatively low amount of water, such as up to about five percent by total weight of the over-coat coating composition, without adversely affecting the metal corrosion-inhibiting properties of the over-coat coating composition, either prior to or after curing. The water can be added to the composition intentionally, or can be present in the composition inadvertently, such as when water is present in a particular component included in the coating composition.

Substantially nonaqueous organic solvents or organic solvent blends may be used advantageously as the under-coat carrier liquid, for example, to obtain more favorable coating rheology, to achieve faster drying or cure times, or to effectively dissolve or solvate another component of the under-coat composition (e.g. the polyester (co)polymer or the under-coat cross-linker). Preferably, the substantially nonaqueous carrier liquid is selected to have sufficient volatility to evaporate essentially entirely from the coating composition during the curing process, such as during heating at about 175-205° C. for about 8 to about 12 minutes.

Organic solvents that are particularly useful as optional under-coat carrier liquids include aliphatic hydrocarbons (e.g., mineral spirits, kerosene, high flashpoint VM&P naptha, and the like); aromatic hydrocarbons (e.g., benzene, toluene, xylene, solvent naphtha 100, 150, 200 and the like); alcohols (e.g. ethanol. n-propanol, isopropanol, n-butanol, iso-butanol and the like); ketones (e.g. 2-butanone, cyclohexanone, methyl aryl ketones, ethyl aryl ketones, methyl isoamyl ketones, and the like); esters (e.g. ethyl acetate, butyl acetate and the like); glycols (e.g. butyl glycol), glycol ethers (e.g. methoxypropanol); glycol ethers (e.g. ethylene glycol monomethyl ether, ethylene glycol monoethyl ether, ethylene glycol monobutyl ether, propylene glycol monomethyl ether, and the like); glycol esters (e.g. butyl glycol acetate, methoxypropyl acetate and the like); and mixtures thereof.

The amount of nonaqueous carrier included in the under-coat composition is limited primarily by the desired, or necessary, rheological properties for application of the composition to the substrate. Preferably, a sufficient amount of nonaqueous carrier is included in the under-coat coating composition to provide a composition that can be processed easily and that can be applied to a metal substrate easily and uniformly, and that is sufficiently removed from the coating composition during curing within the desired cure time.

Therefore, essentially any substantially nonaqueous carrier is useful in the present under-coat coating composition as long as the substantially nonaqueous carrier adequately disperses and/or solubilizes the under-coat composition components; is inert with respect to interacting with composition components; does not adversely affect the stability of the coating composition or the ability of the corrosion-inhibition coating to inhibit corrosion of a metal substrate; evaporates quickly, essentially entirely, and relatively rapidly to provide a cured coating composition that inhibits the corrosion of a metal substrate, demonstrates good adhesion and flexibility, and has good chemical and physical properties.

One optional ingredient is a catalyst to increase the rate of cure or cross-linking in one or both of the under-coat and second coat compositions. Generally, acid catalysts can be used to accelerate the rate of cure of either or both of the under-coat and over-coat coating compositions. In some embodiments, the catalyst is present in an amount of 0.05 to about 5 percent, and preferably about 0.1 to about 1.5 percent, by weight of nonvolatile material.

Examples of suitable catalysts, include, but are not limited to, quaternary ammonium compounds, phosphorous compounds, and tin and zinc compounds, like a tetraalkyl ammonium halide, a tetraalkyl or tetraaryl phosphonium iodide or acetate, tin octoate, zinc octoate, triphenylphosphine, combinations thereof, and similar catalysts known to persons skilled in the art.

Catalysts that are particularly suitable for accelerating the rate of cure for the under-coat composition include, for example, phosphoric acid solutions (e.g. an 85% aqueous phosphoric acid solution in butyl glycol at a 1:1 weight ratio), phosphoric acid ester solutions (e.g. ADDITOL XK 406™, available from Cytec Surface Specialties, Inc., West Paterson, N.J.), and dodecylbenzene sulfonic acid (e.g. CYCAT 600™ available from Cytec Surface Specialties, Inc., West Paterson, N.J.). Additionally or alternatively, tin catalysts can be used, preferably a mixture of mono- and di-octyl tin-mercaptides (e.g. TINSTAB OTS 17 MS™ available from AKZO-Nobel Chemicals, Inc., Chicago, Ill.), or dibutyltin dilaurate (e.g. FASCAT™ available from Atofina Chemicals, Inc., Philadelphia, Pa.).

Catalysts that are particularly suitable for accelerating the rate of cure for the over-coat composition include, for example, aluminum catalysts (e.g. aluminum sec-butoxide, AKZO-Nobel Chemicals, Inc., Chicago, Ill.).

Coating compositions that are to be used as an internal can protective coating typically include a natural or synthetic lubricant. Suitable lubricants include, for example, long-chain aliphatic waxes, carnuba waxes (e.g. Luba-Print 887/C Wax Dispersion available from L. P. Bader & Co., GmbH, Rottweil, Germany) synthetic wax dispersions (e.g. Lanco Glidd 4518V available from Lubrizol, Corp., Wickliffe, Ohio), poly(tetrafluoroethylene) waxes, and mixtures, blends or dispersions thereof.

Because of the use of a PVC (co)polymer organosol in the inventive multi-coat coating system, the protective coating may be susceptible to the coating darkening effects of dehydrochlorination and autocatalytic oxidative cross-linking of PVC (co)polymer. Accordingly, in one preferred embodiment of this invention, a PVC stabilizer (i.e. a hydrogen chloride scavenger) has been used advantageously as an additive to the over-coat coating composition. Alternatively, the PVC stabilizer may be added to the under-coat composition or to both the under-coat and over-coat composition. The PVC stabilizer is preferably present in an amount from about 0.1 up to about 30 percent by weight of the coating composition on a non-volatile solids basis.

Examples of suitable PVC stabilizers include organotin esters such as dibutyl tin dilaurate; maleates, especially dibutyl tin maleate; and mono- and di-octyl tin mercaptides (e.g. TINSTAB OTS 17 MS™, AKZO-Nobel Chemicals, Inc., Chicago, Ill.), which are particularly preferred. Suitable PVC stabilizers also include oxirane-functional chemical compounds that are at least substantially free of BPA, BPF, BADGE and BFDGE. The oxirane-functional chemical compound is preferably selected from epoxidized linseed oil, epoxidized soy bean oil, dimer acid of diglycidyl ether (DGE) and epoxidized polybutadiene. A GMA-functional (meth)acrylic (co)polymer (i.e., the functional (meth)acrylic (co)polymer of the over-coat composition) may also function as a PVC stabilizer.

In some embodiments, a pigment can be added to the under-coat, the over-coat, or both the under-coat and the over-coat compositions. Suitable pigments, such as aluminum flake, titanium dioxide and zinc oxide, may be added to improve the appearance of the protective coating, or to act as scavengers for hydrogen sulfide emitted by foodstuffs that acts to stain or darken the protective coating. A pigment like aluminum flake can be present in one or both of the under-coat coating composition and over-coat coating composition, typically at a concentration from about 2 to about 15 percent by weight, and more typically from about 5 to about 10 percent by weight of the composition on a nonvolatile solids basis. A pigment like titanium dioxide can also be present in one or both of the under-coat coating composition and over-coat coating composition, preferably in an amount from about 35 to about 50 percent by weight, and more preferably from about 40 to about 45 percent by weight of the coating composition. Zinc oxide can also be present in one or both of the under-coat coating composition and over-coat coating composition, preferably in an amount from about 0.5 to about 30 percent by weight, and more preferably from about 5 to about 15 percent by weight of the coating composition.

In some embodiments, one or more additional (co)polymer components may be added to one or both of the under-coat and over-coat compositions. Examples of suitable (co)polymers include solution vinyl (PVC) (co)polymers, solution poly(vinyl)butyral (co)polymers, dispersed or solution meth(acrylic) copolymers, solution polyester (co)polymers, and mixtures thereof. Suitable polymers are commercially available, and include UCAR™ solution vinyl (co)polymers (available from Dow Chemical Co., Midland Mich.), BUTVAR™ solution poly(vinyl)butyral (co)polymers (available from Solutia, Inc., Philadelphia, Pa.), ELVACITE solution (meth)acrylic (co)polymers, and VITEL™ solution polyester (co)polymers.

In one preferred embodiment, UCAR VMCA™ solution vinyl (co)polymer (Dow Chemical Co., Midland Mich.) is added to the over-coat composition in an amount from about one to about ten percent by weight of the over-coat coating composition, and more preferably from about two to about five percent by weight of the over-coat coating composition.

Depending upon the desired application, the under-coat or over-coat coating compositions may include other additives such as water, coalescing solvents, leveling agents, surfactants, wetting agents, dispersants (e.g. lecithin), defoamers (e.g. modified (poly)siloxanes), thickening agents (e.g. methyl cellulose), cure accelerators, suspending agents, adhesion promoters, cross-linking agents, corrosion inhibitors, fillers (e.g. titanium dioxide, zinc oxide, aluminum), matting agents (e.g. precipitated silica) and the like, and combinations thereof.

The coating compositions of the present invention may be prepared by conventional methods, but preferably comprise an under-coat composition and an over-coat composition. The under-coat composition is preferably coated on a surface of a metal substrate, and the over-coat composition is preferably coated on the at least partially cured (hardened) under-coat composition.

The under-coat coating compositions of the present invention may be prepared in various ways. For example, the under-coat coating composition may be prepared by simply admixing the polyester (co)polymer, the under-coat phenolic cross-linker, and any optional ingredients, in any desired order, with sufficient agitation. The resulting mixture may be admixed until all the composition ingredients are substantially homogeneously blended.

Alternatively, the under-coat coating composition may be prepared as a liquid solution or dispersion by admixing to an optional under-coat carrier liquid the polyester (co)polymer, the under-coat phenolic cross-linker, and any optional ingredients, in any desired order, with sufficient agitation. An additional amount of the under-coat carrier liquid may be added to the under-coat coating composition to adjust the amount of nonvolatile material in the coating composition to a desirable level for effective coating. For example, the under-coat coating composition may be prepared by adding the phenolic (co)polymer material to a solution of the polyester (co)polymer in a solvent mixture that may include an alcohol and/or a small amount of water.

Where, as preferred, the under-coat coating composition is applied as a liquid coating, the under-coat coating composition is typically produced by intensive mixing of the raw materials at temperatures of from about 10° C. to about 50° C., and more preferably from about 15° C. to about 35° C., to obtain a substantially homogenous liquid solution. When applied as a liquid coating, the under-coat coating composition typically exhibits a solids content from about 25 to about 70 percent by weight nonvolatile material, and more preferably from about 30 to about 50 percent by weight nonvolatile material.

The over-coat coating composition is preferably applied as a dispersion of solids in an over-coat carrier liquid, and preferably exhibits a solids content from about 25 to about 70 percent, and more preferably from about 35 to about 65 percent by weight nonvolatile material. The over-coat coating composition is typically produced by intensive high-shear mixing or media-milling of the raw materials at temperatures of preferably from about 10° C. to about 48° C., and more preferably from about 15° C. to about 35° C., to obtain a substantially homogenous liquid dispersion.

If either the under-coat or over-coat coating compositions are prepared with optional components, such as a pigment, the steps of preparation may be varied accordingly. In embodiments of the present invention that incorporate pigments, such as aluminum flake, zinc oxide and titanium dioxide, the resulting pigmented coating composition typically has a pigment-to-binder ratio of about 0.5:1 to about 0.85:1, and more typically about 0.6:1 to about 0.7:1. Pigment-to-binder ratio is a measure, on the basis of weight, of parts of pigment for every 1 part of (co)polymer, or non-pigment, which includes all coating components that are not pigment and not volatilized after the curing step.

The hardenable coating compositions of the present invention are useful, for example, as protective coatings to prevent contamination of foodstuffs contained in a metal packaging container by the packaging metal or the protective lacquer and to prevent attack by the foodstuffs on the metal container. The inventive protective coating compositions are particularly effective at imparting resistance to attack by acidic foodstuffs and beverages. The compositions are especially useful in coating food or beverage cans, particularly the interiors of such cans, where their virtually undetectable levels of BPA and aromatic glycidyl ether chemical compounds and their other chemical, physical and mechanical properties make them particularly desirable.

The aforementioned coating compositions are particularly well adapted for use as an internal surface coating for multi-part foodstuffs packaging containers (e.g., two-piece cans, three-piece cans, etc.). Two-piece cans are manufactured by joining a can body (typically a drawn metal body) with a can end closure (typically a drawn metal end). The inventive coating compositions are well suited for use in food contact situations and may be used on the inside of such cans and components used in fabricating foodstuffs containers. The multi-coat coating systems of the present invention are particularly well suited for providing a protective coating to the interior surface of "easy-open" end closures used in fabricating containers for foodstuffs and beverages, particularly for vacuum-packed foodstuffs.

Protective coatings for fabricating food and beverage containers may be applied to metal substrates and cured into films at high speed, on high-speed coating lines (e.g., coil coating lines). The coating agents are typically applied in a roller coating process either continuously on coil lines or batch-wise on sheet coating lines to thin metals such as aluminum, tinplate, tin free steel or chromed steel, and then reacted at high temperatures. The coated metals thus produced are then shaped to form the desired metal packaging articles by processes such as, for example, deep-drawing, stamping, creasing and flanging. This machining requires very high flexibility and excellent adhesion of the coating agents used. In such applications, the coatings preferably should not experience any change in the protective function due to the reshaping processes and, in addition, should preferably exhibit suitable adhesion and have intact surfaces.

Modern high-speed coil coating lines typically require coatings that will dry and cure within a few seconds when heated rapidly to peak metal temperatures of 420° F. to 550° F. (about 215° C. to about 300° C.). Many metal packaging articles, after filling with the foods, are subjected to exposure to similar high temperature in thermal processes for food preservation (e.g. pasteurization or sterilization). After these high temperature thermal processes, the protective coatings ideally exhibit little or no change with respect to protective function, adhesion, flexibility, appearance, or chemical composition.

The inventive multi-coat systems can be applied as coatings to a variety of metal substrates such as tinplate, tin free steel, aluminum and its alloys, and the like. The compositions can be applied as a film by conventional means such as, for example, brushing, roller coating or spraying. Roller coating is the preferred method when coating flat metal for can manufacture and spraying is preferred when coating preformed cans.

Preferably, the under-coat composition is applied as a substantially uniform and continuous defect-free layer or film on the metallic substrate used, and the over-coat composition is applied on the cured under-coat composition as a substantially uniform and continuous defect-free layer or film. Preferably, the under-coat and over-coat layers are substantially free from surface defects, such as, for example, craters, pinholes, and de-wet regions.

Metal coatings are generally applied to metal sheets in one of two ways, each of which involves different coating and curing conditions. The coated metal sheets may be fabricated into can bodies or ends in a later stage of the manufacturing operation.

One process, called the sheet bake process, involves roll coating large metal sheets. These sheets are then placed upright in racks and the racks are typically placed in ovens for about 10 minutes to achieve peak metal temperatures of about 180° C. to about 205° C. In a second process known as coil coating, large rolls of thin gage metal (e.g., steel or aluminum) are unwound, roll coated, heat cured and rewound. During the coil coating process, the total residence time in the curing ovens will vary from about 2 seconds to about 20 seconds with peak metal temperatures typically reaching about 215° C. to about 300° C.

The present invention may be useful as a spray applied, liquid coating for the interior of two-piece drawn and ironed tinplate food cans (hereinafter "tinplate D&I cans"). The present invention also offers utility in other metal substrate coating applications. These additional applications include, but are not limited to: coil coating, sheet coating, and the like.

A coil coating is described as the coating of a continuous coil composed of a metal (e.g., steel or aluminum). Once coated, the coating coil is typically subjected to a short thermal, ultraviolet, and/or electromagnetic curing cycle, which lead to the drying and curing of the coating. Coil coatings provide coated metal (e.g., steel and/or aluminum) substrates that can be fabricated into formed articles such as two-piece food cans, three-piece food cans, food can ends, beverage can ends and the like.

A sheet coating is described as the coating of separate pieces of a variety of materials (e.g., steel or aluminum) that have been pre-cut into square or rectangular 'sheets'. Typical dimensions of these sheets are approximately one square meter. Once coated, each sheet is cured. Once dried and cured, the sheets of the coated substrate are collected and prepared for subsequent fabrication. Sheet coatings provide coated metal (e.g., steel or aluminum) substrate that can be successfully fabricated into formed articles such as two-piece food cans, three-piece food cans, food can ends, drawn and ironed cans, beverage can ends and the like.

In a preferred embodiment, the method of the present invention includes applying an under-coat coating composition of the present invention onto a surface of a metal substrate to form a first coating layer, heating the coated substrate so that the first coating layer at least partially cures to form a cured film adhered to the substrate surface, applying an over-coat coating composition of the present invention onto the first coating layer to form a second coating layer, and heating the coated substrate so that the second coating layer at least partially cures to form a cured film adhered to the first coating layer. The first coating layer and the second coating layer may be applied in a single pass, in multiple passes, or in combination with additional coating layers placed between the metal substrate and the first coating layer (e.g. a priming or subbing layer) or on top of the second coating layer. In some embodiments, one or more intermediate layers may be included between the first and second coating layers.

The preferred method of applying coating compositions of the present invention to metal substrates is roll coating (e.g., by direct roll coating, reverse roll coating, rotogravure coating, and the like). The coating compositions can generally be roll coated to produce cured films having overall multi-coat film weights of about 8 g/m$^2$ to about 28 g/m$^2$.

In some embodiments, the under-coat and over-coat compositions, after application to the metal substrate, are at least partially cured (i.e. hardened or cross-linked) by exposure to heat, actinic radiation (e.g. ultraviolet or infrared curing), electromagnetic radiation (e.g. electron beam curing), combinations thereof and the like. In certain preferred embodiments, the under-coat composition on the metal substrate is at least partially cross-linked before applying the over-coat composition.

The applied under-coat and over-coat coating compositions can be dried and cured by heating to drive off at least a portion of any carrier liquids and/or to accelerate a cross-linking reaction. The coated composition is typically heated to 150-220° C. for 1 to 20 minutes in order to form a dried, cured film.

If the coating is applied using a sheet-bake process, the coated metal substrate is preferably cured at a temperature of about 175° C. to about 205° C. for about 8 to about 10 minutes. In contrast, when the coating is carried out using a coil-coating process, the coated metal substrate is preferably cured by heating for about 2 to about 20 seconds at a temperature of about 230° C. to about 300° C.

The hardened protective coating compositions of the present invention preferably exhibit good adhesion to both the metal substrate and within the coated layers (i.e. intercoat adhesion). The hardened coating compositions on metal substrates may be shaped mechanically to form foodstuffs containers or "easy-open" end closures; for example by deep-drawing, creasing and flanging. After forming, the metal containers may be filled with a foodstuff, and then sterilized. The hardened protective coating compositions of the present invention exhibit good flexibility and chemical resistance, especially in the presence of foodstuffs containing acetic acid, citric acid and/or lactic acid, without exhibiting loss of adhesion or discoloration.

The examples that follow are intended to illustrate the preparation and use of the presently described invention, but are not intended to be limiting in any way.

EXAMPLES

Examples 1-6 illustrate the chemical synthesis of exemplary polyester (co)polymers according to the present invention. Examples 7-12 illustrate the chemical synthesis of exemplary functional (meth)acrylic (co)polymers containing carboxyl, hydroxyl or oxirane functionality. Examples 13-15 illustrate the preparation of exemplary under-coat coating compositions containing a polyester (co)polymer and an under-coat cross-linker. Examples 16-18 illustrate the preparation of exemplary over-coat coating compositions containing a PVC (co)polymer dispersed in a substantially nonaqueous carrier liquid, an over-coat cross-linker, and a functional (meth)acrylic (co)polymer. Examples 19-22 illustrate use of the exemplary under-coats and over-coats of the present invention to provide protective coatings to metal substrates. Examples 23-25 are comparative examples.

Examples 1-6

Synthesis of Polyester (Co)Polymers

The following general method was used to produce polyesters partly obtained by trans-esterification of esters of dicarboxylic acids (e.g. dimethylterephtalate), as in Example 1. The raw materials of Table I, Example 1 (all available from Sigma-Aldrich Chemical Company, St. Louis, Mo.), except the terephthalic acid, were charged to the reaction vessel of a reaction apparatus (equipped with an overhead fractionating column and Dean-Stark condenser for removing water, an overhead stirrer, and a nitrogen inlet) in the order listed in Table I. The charged reactants were heated while stirring under a dry nitrogen ($N_2$) blanket until the onset of methanol distillation. Heating was continued to maintain the overhead column temperature at about 73-75° C. with removal of methanol until 90% of the theoretical amount of methanol was removed.

Then the terephthalic acid was added and heating continued with removal of water while maintaining the temperature at the column head between 99-102° C. The temperature of the product was allowed to increase progressively to about 230° C. The acid and hydroxyl values were checked regularly, and the reaction was stopped by cooling when the hydroxyl value of the polyester reached a value of about 30-40 mg KOH/g polyester, and the acid number reached a value of about 5 mg KOH/g polyester.

The following general method was used to produce a series of exemplary polyester (co)polymers based on diacids, as in Examples 2-6. The raw materials of Table I, Examples 2-6, all available from Sigma-Aldrich Chemical Company (St. Louis, Mo.), were charged to the reaction vessel of the reaction apparatus of Example 1 in the order listed in Table I. The charged reactants were heated while stirring under a dry nitrogen ($N_2$) blanket until the onset of water distillation. Heating was continued with removal of water while maintaining the temperature at the head of the column between 99-102° C. The temperature of the product was allowed to increase progressively to about 230° C. The acid and hydroxyl numbers were checked regularly and the reaction was stopped by cooling when the hydroxyl number of the polyester reached a value of about 25-35 mg KOH/g polyester and the acid number reached a value of about 5 mg KOH/g polyester.

TABLE I

Preparation of Polyester (Co)polymers (Examples 1-6)

| Raw Material | Example 1 (% w/w) | Example 2 (% w/w) | Example 3 (% w/w) | Example 4 (% w/w) | Example 5 (% w/w) | Example 6 (% w/w) |
|---|---|---|---|---|---|---|
| Ethylene Glycol | 6.00 | 0.00 | 1.00 | 0.00 | 0.00 | 1.06 |
| Propylene Glycol | 19.40 | 0.00 | 3.30 | 0.00 | 0.00 | 3.37 |
| Diethylene Glycol | 0.00 | 22.50 | 19.00 | 26.48 | 36.42 | 18.88 |
| Neopentyl Glycol | 0.00 | 15.00 | 13.00 | 0.00 | 0.00 | 13.39 |
| Trimethylolpropane | 4.20 | 2.00 | 2.30 | 1.96 | 1.96 | 2.41 |
| Dimethylterephthalate | 58.0 | 0.00 | 0.00 | 0.00 | 0.00 | 0.00 |
| Isophthalic Acid | 0.00 | 30.50 | 25.40 | 29.24 | 28.54 | 25.34 |
| Terephthalic Acid | 12.40 | 30.00 | 36.00 | 28.73 | 28.03 | 35.55 |
| Cyclohexane Dimethanol | 0.00 | 0.00 | 0.00 | 13.60 | 0.00 | 0.00 |
| Dimer fatty acid | 0.00 | 0.00 | 0.00 | 0.00 | 5.05 | 0.00 |
| Product Characteristics | — | — | — | — | — | — |
| Percent Nonvolatile Solids (% w/w) | 52.0 | 53.0 | 52.5 | 52.5 | 53.4 | 52.0 |
| Hydroxyl Number (mg KOH/g solids) | 39 | 25 | 34 | 27 | 24 | 30 |
| Viscosity (mPa-sec) | 5 | 4 | 4.5 | 4.9 | 3.7 | — |

Examples 7-9

Synthesis of Carboxyl-Functional (Meth)Acrylic (Co)Polymer

The following general method was used to produce the three exemplary carboxyl-functional (meth)acrylic (co)polymers of Examples 7-9 as shown in Table II. The raw materials from Table II are available from the suppliers listed in Table II. The percentages given in the table are standardized to 100 percent on a weight basis.

TABLE II

Preparation of Carboxyl-functional (Meth)acrylic Copolymers

| Raw Material | Raw Material Available From | Example 7 (% w/w) | Example 8 (% w/w) | Example 9 (% w/w) |
| --- | --- | --- | --- | --- |
| Solvesso 100 ™ Over-coat Carrier Liquid | Exxon/Mobil Chemical Co., Houston, TX | 37.56 | 30.35 | 37.46 |
| Butyl Methacrylate | Elf Atochem, Inc., Philadelphia, PA | 0.00 | 46.51 | 0.00 |
| Ethyl Methacrylate | Elf Atochem, Inc., Philadelphia, PA | 46.22 | 0 | 46.1 |
| Methacrylic Acid | Elf Atochem, Inc., Philadelphia, PA | 2.29 | 1.85 | 0.00 |
| Acrylic Acid | Elf Atochem, Inc., Philadelphia, PA | 0.00 | 0.00 | 1.92 |
| Trigonox B ™ di-tert butyl peroxide Initiator | AKZO-Nobel Chemicals, Inc., Chicago, IL | 1.21 | 1.63 | 2.00 |
| Butyl Glycol Over-coat Carrier Liquid | BP/Shell Chemicals, Houston, TX | 12.72 | 19.66 | 12.52 |
| Product Characteristics | — | — | — | — |
| Percent Non-volatile Solids (% w/w) | — | 50.1 | 48.9 | 50.5 |
| Acid Number (mg KOH/g solids) | — | 29.8 | 25.5 | 28.5 |

The Solvesso 100™ carrier liquid was added to a glass reaction flask equipped with a mechanical stirrer, a condenser, a nitrogen inlet, a thermocouple connected to a temperature controller, and a heating mantle connected to the temperature controller. The reaction flask was blanketed with dry nitrogen ($N_2$) and heated to about 125-130° C. The monomers from Table II were then added to the heated reaction flask in the order listed, and the Trigonox B™ di-tert butyl peroxide initiator was added to initiate the free radical polymerization.

After the initiator addition, the reaction mixture was maintained at 125° C.-130° C. for about four hours. Then the butyl glycol was added to reduce the non-volatile solids content of the copolymer solution. The final carboxyl-functional (meth)acrylic (co)polymer products exhibited an acid number of about 25-30 mg KOH/g (co)polymer. The carboxyl-functional (meth)acrylate (co)polymers contained about 1.85-2.3 percent of methacrylic acid or acrylic acid by weight on a dry solids basis.

Example 10

Synthesis of Hydroxyl-Functional (Meth)Acrylic (Co)Polymer

The following example illustrates the preparation of a hydroxyl-functional (meth)acrylic (co)polymer as shown in Example 10. The compositional ingredients of the (co)polymer of Example 10 are included below in Table III.

TABLE III

Preparation of Hydroxyl-functional (Meth)acrylic Copolymer

| Raw Material | Raw Material Available From | Example 10 (g) |
| --- | --- | --- |
| Diisobutyl ketone | BP/Shell Chemicals, Inc., Houston, TX | 23,780.0 |
| Trigonox B ™ di-tert butyl peroxide Initiator | AKZO-Nobel Chemicals, Inc., Chicago, IL | 54.5 |
| VAZO-64 azobis isobutyronitrile Initiator | Wako Chemicals U.S.A., Dallas, TX | 54.5 |
| Ethyl Methacrylate | Elf Atochem, Inc., Philadelphia, PA | 19,120.0 |
| 2-Hydroxyethyl-methacrylate | Elf Atochem, Inc., Philadelphia, PA | 1,000.0 |
| Trigonox B ™ di-tert butyl peroxide Initiator | AKZO-Nobel Chemicals, Inc., Chicago, IL | 236.1 |
| VAZO-64 azobis isobutyronitrile Initiator | Wako Chemicals U.S.A., Dallas, TX | 204.3 |
| n-dodecyl mercaptan Chain Transfer Agent | Sigma-Aldrich Chemical Co., St. Louis, Missouri | 118.0 |
| Product Characteristics | — | — |
| Percent Non-volatile Solids (% w/w) | — | 46 |
| Hydroxyl Number (mg KOH/g solids) | — | 30-35 |

Diisobutyl ketone (23.78 kg) was added to a clean dry reaction vessel and blanketed with dry nitrogen ($N_2$). The diisobutyl ketone was heated to 110° C. Then 54.5 g Trigonox B™, a di-t-butylperoxide polymerization initiator available from AKZO-Nobel Chemicals, Inc. (Chicago, Ill.), and 54.5 g VAZO 64, an azobis isobutyronitrile polymerization initiator available from Wako Chemicals U.S.A. (Dallas, Tex.), were added to the heated diisobutyl ketone.

In a separate vessel a monomer premix containing 19.12 kg of ethyl methacrylate, 1 kg of 2-hydroxyethylmethacrylate, 204.3 g VAZO 64, 118.0 g of n-dodecyl mercaptan, and 236.1 g of Trigonox B™ was prepared. After five minutes, ten weight percent of the monomer premix was quickly added to the reaction vessel. The remaining 90 weight percent of the monomer premix was then added slowly to the reaction vessel over a three hour time period while maintaining the temperature of the reaction mixture at about 110° C. After the three-hour monomer addition period, the vessel holding the monomer mix was then rinsed with 331.4 g of diisobutyl ketone, which was added to the reactor. After the entire monomer blend and rinse was added to the reactor, the reaction mixture was held at 110° C. for an additional 30 minutes. Then, while maintaining the reaction temperature at 110° C., a solution of 308.7 g of t-butyl peroctoate in 308.7 g of diisobutyl ketone was added to the reaction mixture in twelve equal portions at 15-minute intervals. The resulting reaction mixture was held at 110° C. for 60 minutes, then cooled. The resulting reaction product contained 46% by weight of the ethyl methacrylate-2-hydroxyethyl methacrylate copolymer. The hydroxyl-functional (meth)acrylate (co)polymer contained about 95% ethyl methacrylate and 5% 2-hydroxyethyl methacrylate by weight on a dry solids basis.

Examples 11-12

Synthesis of Oxirane-Functional (Meth)Acrylic (Co)Polymers

The following examples (the compositional ingredients of which are summarized below in Table IV) illustrate the preparation of oxirane-functional (meth)acrylic (co)polymers useful in the present invention. Additional examples are provides by Example 1, Runs 1-4, of co-pending published U.S. Patent Application 20040259989, titled "Aqueous Dispersions and Coatings," filed Apr. 2, 2004, which is incorporated herein by reference. Other suitable examples are provided in issued U.S. Pat. No. 6,916,874, filed Aug. 2, 2002 and assigned to a common assignee, which is incorporated herein by reference.

TABLE IV

Preparation of Oxirane-functional (Meth)acrylic Copolymers

| Raw Material | Raw Material Available From | Example 11 (g) | Example 12 (g) |
|---|---|---|---|
| n-Butanol Over-coat Carrier Liquid | Exxon/Mobil Chemical Houston, TX | 245.0 | 0.0 |
| Butyl Cellosolve ™ Over-coat Carrier Liquid | BP/Shell Chemicals, Houston, TX | 804.0 | 0.0 |
| Di-isobutyl ketone Over-coat Carrier Liquid | Dow Chemical Co., Midland, MI | 0.0 | 132.3 |
| t-butyl peroctoate, Initiator | Sigma-Aldrich St. Louis, MO | 14.2 | 0.0 |
| Styrene | Sigma-Aldrich St. Louis, MO | 1162.0 | 0.0 |
| 2-Hydroxyethylmethacrylate | Elf Atochem, Inc., Philadelphia, PA | 888.0 | 0.0 |
| Glycidyl methacrylate | Sigma-Aldrich | 64.1 | 105.8 |
| Ethyl methacrylate | Atofina Chemicals Philadelphia, PA | — | 423.6 |
| t-butyl peroctoate, Initiator | As Above | 90.4 | 0.0 |
| t-butyl peroxide, Initiator | Aztec Peroxides, Houston, TX | | 21.2 |
| Butyl Cellosolve ™ Over-coat Carrier Liquid | As above | 105.0 | 201.2 |
| t-butyl peroctoate | As Above | 14.2 | 0.0 |
| Luperox DTA ™ | Atofina Chemicals Philadelphia, PA | 0.0 | 21.2 |
| Butyl Cellosolve ™ Over-coat Carrier Liquid | As above | 27.0 | 94.7 |
| t-butyl peroctoate | As Above | 3 × 4.34 | 0.0 |
| Percent Non-volatile Solids (% w/w) | — | — | 55.0 |

In Example 11, a reaction apparatus equipped with a reaction flask, stirrer, reflux condenser, thermocouple, heating mantle and nitrogen blanket was provided. To the flask was added 245 g n-butanol and 804 g butyl Cellosolve™. The reaction flask was then blanketed with dry nitrogen ($N_2$). The flask was heated to 98° C., and 14.2 g t-butyl peroctoate were added. In a separate vessel, a monomer premix was prepared containing 1162 g styrene, 888 g 2-hydroxy ethyl methacrylate, 64.1 g glycidyl methacrylate, and 90.4 g t-butyl peroctoate.

After five minutes the monomer premix was added to the flask over two and a half hours while maintaining the temperature at 97° C. to 101° C. An initiator premix comprising 105 g butyl Cellosolve™ and 45.1 g t-butyl peroctoate was then prepared. When the monomer premix addition was complete, the premix vessel was rinsed with 43 g butyl Cellosolve. The initiator premix was then added over a one hour period. When the initiator premix addition was complete, the vessel was rinsed with 27 g butyl Cellosolve™.

The batch was held at 98° C. to 99° C. for one hour. At the end of the hour 4.34 g t-butyl peroctoate were added and the batch was held for one hour. At the end of the hour a second addition of 4.34 g t-butyl peroctoate was made and the batch was held an additional one hour. At the end of the hour a third addition of 4.34 g t-butyl peroctoate was made and the batch was held one hour. The batch was then cooled, yielding an oxirane-functional (meth)acrylic (co)polymer having an oxirane value of 0.018 equivalents/100 grams solid (co)polymer, an acid number of approximately 2-3 mg KOH/g (co)polymer, and a non-volatile solids content of 62.5 percent by weight.

Example 12, a reaction apparatus equipped with a reaction flask, stirrer, reflux condenser, thermocouple, heating mantle and nitrogen blanket was provided. The reaction flask was then blanketed with dry nitrogen ($N_2$). To the flask was added 132.3 g of Di-isobutyl ketone (DIBK). The flask was heated to 140° C. In a separate vessel, a monomer premix was prepared containing 423.6 g of ethyl methacrylate, 105.8 g of glycidyl methacrylate and 21.2 g of the catalyst di-t-Butyl Peroxide. These ingredients were mixed for about 30 minutes, then added to the reaction flask over a four hour period. The temperature was maintained at about 140-145° C. The reflux rate was low to moderate.

After the four-hour addition period, the batch was held for 90 minutes at 140-145° C. About one hour before the end of the hold, a premix containing 201.2 g of butyl Cellosolve™ and 21.2 g of Luperox DTA™ was prepared and allowed to mix for about 30 minutes. About 30 minutes before the end of the 90-minute hold, the temperature was slowly increased to about 145-150° C. At the end of the 90-minute hold, the butyl Cellosolve™/Luperox DTA™ were added to the reaction flask over about two hours while maintaining a temperature of about 145-150° C. After another two-hour hold, 94.8 g of butyl Cellosolve™ was added and the batch was allowed to cool to 120° C., with continued cooling to 60° C. and then room temperature.

Example 13-15

Preparation of Exemplary Under-Coat Coating Compositions

In Example 13, an exemplary (a) under-coat coating compositions containing (i) a polyester (co)polymer, and (ii) an (blocked isocyanate) under-coat cross-linker, were prepared using the materials and according to the formulation summarized in Table V below.

TABLE V

Preparation of Exemplary Under-coat Coating Composition

| Raw Material | Raw Material Available From | Example 13 (g) |
|---|---|---|
| Dibutyl Ether (DBE) Under-coat Carrier Liquid | DuPont Chemical Corp., Wilmington, DE | 80.0 |
| Aromatic 100 Solvent Under-coat Carrier Liquid | Exxon-Mobil Chemical Co. Houston, TX | 80.0 |
| Eastman EB ™ Solvent Under-coat Carrier Liquid | Eastman Chemical Co. Knoxville, TN | 40.0 |
| Vestanat B 1358A ™ 2-butanone oxime blocked-isocyanate Under-coat Cross-linker | Degussa, A.G. Marl, Germany | 22.1 |
| Dynapol L 952 ™ Polyester (co)polymer | Degussa, A.G. Marl, Germany | 133.4 |
| Aromatic 100 Solvent Under-coat Carrier Liquid | Exxon-Mobil Chemical Co. Houston, TX | 25.1 |
| A-2291FG Aluminum Paste | Silberline Manufacturing Co. | 25.1 |
| Cyclohexanone Under-coat Carrier Liquid | BASF Corp.. | 5.3 |

TABLE V-continued

Preparation of Exemplary Under-coat Coating Composition

| Raw Material | Raw Material Available From | Example 13 (g) |
|---|---|---|
| FASCAT 4102 ™ Catalyst | Atofina-ARKEMA Chemicals, Philadelphia, PA | 0.2 |
| FASCAT 2003 ™ Catalyst | Atofina-ARKEMA Chemicals, Philadelphia, PA | 0.6 |
| Dibutyl Ether (DBE) Under-coat Carrier Liquid | Dow Chemical Co. Midland, MI | 5 |
| Aromatic 100 Solvent Under-coat Carrier Liquid | Exxon-Mobil Chemical Co. Houston, TX | 52.2 |
| Diisobutylketone Under-coat Carrier Liquid | Dow Chemical Co. Midland, MI | 31.0 |

As shown in Table V, dibutyl ether (DBE), Aromatic 100 Solvent™ and glycol ether EB™ were added to a mixing vessel. UCAR VMCA™ solution vinyl (co)polymer was then added to the mixing vessel and stirred until all of the (co)polymer was dissolved. Vestanat B 1358™ 2-butanone oxime-blocked isocyanate under-coat cross-linker and Dynapol L 952™ polyester (co)polymer having low number average functionality were then added the mixing vessel and mixed until the (co)polymer components were dissolved.

In a separate container, aromatic 100 solvent and A-2291FG aluminum flake paste were pre-mixed until a smooth consistency was obtained, then the pigment dispersion was added to the mixing vessel with additional mixing. Two catalysts, FASCAT 4102™ and FASCAT 2003™ were added to cyclohexanone in a separate container, mixed until homogenous, then added to the mixing vessel with additional mixing. Dibutyl Ether (DBE), Aromatic 100 solvent and diisobutylketone were then added to the mixing vessel, and the under-coat coating composition was mixed until substantially homogenous.

In Example 14, exemplary (a) under-coat coating compositions containing (i) a polyester (co)polymer blend, and (ii) an (phenolic) under-coat cross-linker, was prepared using the materials included in Table VI below and according to the methods described below.

TABLE VI

Preparation of Exemplary Under-coat Coating Composition

| Raw Material | Raw Material Available From | Example 14 (% w/w) | Example 15 (% w/w) |
|---|---|---|---|
| DOWANOL ™ PM Acetate Under-coat Carrier Liquid | Dow Oxygenated Solvents, Midland, MI | 16.31 | 16.31 |
| Xylene Under-coat Carrier Liquid | Sigma-Aldrich Chemical Co., St. Louis, MO | 8.10 | 8.10 |
| Polyester (Co)polymer | Example 1 | 10.02 | 0.00 |
| Polyester (Co)polymer | Example 2 | 52.22 | 0.00 |
| URALAC ZW5007SH Polyester (Co)polymer | DSM Resins U.S., Inc., Augusta, GA | 0.00 | 62.24 |
| BAKELITE PF 6470 LB ™ Resole Phenolic Resin @ 76% w/w in n-Butanol | BAKELITE ™, A.G., Iserlohn, Germany | 8.90 | 8.90 |
| VARCUM 2227 B55 ™ Resole Phenolic Resin @ 55% w/w in n-Butanol | Reichhold Chemical A.G. Austria | 3.95 | 0.00 |
| BAKELITE 9989LB ™ Resole Phenolic Resin | BAKELITE ™, A.G., Iserlohn, Germany | 0.00 | 3.95 |
| CYCAT 600 ™ Catalyst | Cytec Surface Specialties, West Paterson, NJ | 0.06 | 0.06 |
| DOWANOL PM ™ Under-coat | Dow Oxygenated Solvents, Midland, MI | 0.24 | 0.24 |

TABLE VI-continued

Preparation of Exemplary Under-coat Coating Composition

| Raw Material | Raw Material Available From | Example 14 (% w/w) | Example 15 (% w/w) |
|---|---|---|---|
| Carrier Liquid ADDITOL XK406™ Catalyst | Cytec Surface Specialties, West Paterson, NJ | 0.20 | 0.20 |

As shown above in Table VI, a blend of two synthetic polyester (co)polymers from Examples 1 and 2, prepared at a weight ratio of about 1/5, was added to a substantially nonaqueous solvent mixture of DOWANOL™ PM Acetate and xylene in a mixing vessel with external agitation. The two hydroxyl-functional polyester resins exhibited a hydroxyl number of 25 and 39 mg KOH per gram of resin, respectively.

Two resole phenolic cross-linking resins, Bakelite PF 6470 LB™ and VARCUM 2227 B55™, were supplied pre-dissolved in n-butanol and were added to the mixing vessel with external agitation. CYCAT 600™ catalyst pre-dissolved in DOWANOL™ PM Acetate at about 20% w/w was then added to the mixing vessel, followed by the addition of ADDITOL XL406™ catalyst.

In Example 15, a preferred variation of Example 14, a single commercially available polyester (co)polymer, URALAC ZW5007SH™, was substituted for the blend of two synthetic polyester (co)polymers from Examples 1 and 2. In addition, a resole phenolic cross-linker, BAKELITE 9989LB™, was substituted for VARCUM 2227 B55™ solution. The above described under-coat mixture was mixed until a substantially homogeneous, free-flowing coating solution was obtained. This under-coat composition was used to coat metal substrates for use in fabricating metal scrolls. The percentages given in Table VI are standardized to 100.

Example 16-18

Preparation of Exemplary Over-Coat Coating Compositions

In Examples 16-17, exemplary over-coat coating compositions containing a poly(vinyl chloride) (co)polymer dispersed in a substantially nonaqueous over-coat carrier liquid, an over-coat (phenolic) cross-linker, and an oxirane-functional (meth)acrylic (co)polymer, were prepared using the materials and according to the formulation summarized in Table VII. The weights presented in Table VII are in grams, and correspond to the weights of raw materials required to produce a 500 g batch of the under-coat composition.

In Example 16, glycol ether EB™ and diisobutylketone were added to a mixing vessel. UCAR VMCA™ solution vinyl (co)polymer was then added to the mixing vessel and stirred until all of the (co)polymer was dissolved. Geon 178™ PVC (co)polymer was added to the mixing vessel and dispersed at high speed for approximately 30 minutes, maintaining the temperature between 29-35° C. The oxirane-functional (meth)acrylic (co)polymer of Example 11 and SANTOLINK EP 560™, a phenol-formaldehyde over-coat cross-linker were added to the mixing vessel with additional mixing. Glycol ether EB™, Aromatic 100 solvent, 10% phosphoric acid in 2-propanol (catalyst), and Lanco Glidd 4518V™ synthetic wax dispersion were then added to the mixing vessel, and the over-coat coating composition was mixed until uniform.

In Example 17, Glycol ether EB™ and diisobutylketone were added to a mixing vessel. UCAR VMCA™ solution vinyl (co)polymer was then added to the mixing vessel and stirred until all of the (co)polymer was dissolved. Geon 178™ PVC (co)polymer was added to the mixing vessel and dispersed at high speed for approximately 30 minutes, maintaining the temperature between 29-35° C.

TABLE VII

Preparation of Over-coat Coating Composition

| Raw Material | Raw Material Available From | Example 16 (g) | Example 17 (g) |
|---|---|---|---|
| Glycol Ether EB™ Over-coat Carrier Liquid | Dow Oxygenated Solvents, Midland, MI | 30.0 | 26.0 |
| Diisobutylketone Over-coat Carrier Liquid | Dow Chemical Co. Midland, MI | 65.0 | 55.5 |
| UCAR VMCA™ Vinyl (co)polymer | Dow Chemical Co. Midland, MI | 14.5 | 12.5 |
| GEON 178™ PVC (co)polymer | PolyOne Corp. Pasadena, TX | 230.5 | 197.5 |
| Aromatic 100 Solvent Over-coat Carrier Liquid | Exxon-Mobil Chemical Co. Houston, TX | 0 | 35.5 |
| A-2291FG Aluminum Paste | Silberline Manufacturing Co. | 0 | 35.5 |
| Oxirane-functional GMA-(meth)acrylic copolymer | Example 12 | 79.0 | 67.5 |
| SANTOLINK EP 560™ Phenol-formaldehyde Basic-functional Over-coat | CYTEC Surface Specialties, West Paterson, NJ | 32.5 | 28.0 |

TABLE VII-continued

Preparation of Over-coat Coating Composition

| Raw Material | Raw Material Available From | Example 16 (g) | Example 17 (g) |
| --- | --- | --- | --- |
| Cross-linker | | | |
| Glycol Ether EB ™ Over-coat Carrier Liquid | Dow Oxygenated Solvents, Midland, MI | 12.5 | 11.0 |
| Aromatic 100 Solvent Over-coat Carrier Liquid | Exxon-Mobil Chemical Co. Houston, TX | 12.5 | 11.0 |
| 10% Solution of Phosphoric Acid in 2-propanol | The Valspar, Corp. Pittsburg, PA | 15.5 | 13.5 |
| Lanco Glidd 4518V Synthetic Wax Dispersion | Lubrizol, Corp. Wickliffe, OH | 8.0 | 6.5 |

In a separate container, aromatic 100 solvent and A-2291FG aluminum flake paste were pre-mixed until a smooth consistency was obtained, then the pigment dispersion was added to the mixing vessel with additional mixing. A glycidyl methacrylate (GMA) oxirane-functional acrylic (co)polymer and SANTOLINK EP 560™, a phenol-formaldehyde basic-functional over-coat cross-linker were added to the mixing vessel with additional mixing. Glycol ether EB™, Aromatic 100 solvent, 10% phosphoric acid in 2-propanol (catalyst), and Lanco Glidd 4518V™ synthetic wax dispersion were then added to the mixing vessel, and the over-coat coating composition was mixed until uniform.

In Example 18, an exemplary over-coat coating composition containing a poly(vinyl chloride) resin dispersed in a substantially nonaqueous over-coat carrier liquid, an over-coat (phenolic) cross-linker, and a carboxyl-functional (meth)acrylic (co)polymer, was prepared using the materials and according to the formulation summarized in Table VIII. The percentages given in Table VIII are standardized to 100 percent on a weight basis. The raw materials were charged to the mixing vessel in the order listed in Table VIII. Lanolin was added to an agitated mixing vessel containing Aromatic Solvent 100 KB91™, Aromatic Solvent European (EU)™, DOWANOL™ PM Acetate and glycol ether EB™. The carboxyl-functional (meth)acrylic (co)polymer of Example 7 was then added to the mixing vessel with additional agitation. GEON 178™ PVC homopolymer was then added to the vessel and mixed with a high speed disperser for approximately 60 minutes at 30-35° C. to obtain a substantially homogenous PVC dispersion, taking care not to exceed a temperature of 35° C.

Two resole phenolic cross-linking resins, VARCUM 2227 B55™ and DUREZ 33163™, were then added to the mixing vessel with additional agitation. LUBA-PRINT 887/C™ Wax Dispersion was then added with additional mixing, followed by TINSTAB OTS 17 MS™ hydrogen chloride scavenger in a mixture of xylene and ethyl acetate. After additional mixing, aluminum sec-butoxide catalyst was added to the mixture, followed by additional mixing. The over-coat mixture of Example 8 was mixed until a macroscopically homogeneous, free-flowing coating dispersion was obtained.

TABLE VIII

Preparation of Exemplary Over-coat Coating Composition

| Raw Material | Raw Material Available From | Example 18 (% w/w) |
| --- | --- | --- |
| Aromatic Solvent 100 KB91 ™ Over-coat Carrier Liquid | Exxon/Mobil Chemical Co., Houston, TX | 7.35 |
| Aromatic Solvent 100 EU ™ Over-coat Carrier Liquid | Exxon/Mobil Chemical Co., Machelen, Belgium | 1.89 |
| Glycol Ether EB ™ Over-coat Carrier Liquid | Dow Oxygenated Solvents, Inc., Midland, MI | 7.88 |
| DOWANOL PM Acetate ™ Over-coat Carrier Liquid | Dow Oxygenated Solvents, Inc., Midland, MI | 8.42 |
| Lanolin | Sigma-Aldrich Chemical Co., St. Louis, MO | 0.63 |
| Carboxyl-functional (meth)acrylic Copolymer | Example 7 | 11.79 |
| GEON 178 ™ PVC Homopolymer | PolyOne Corp., Pasadena, TX | 40.39 |
| VARCUM 2227 B 55 ™ Resole Phenolic Resin | Reichhold Chemical A.G. Austria | 5.69 |
| DUREZ 33163 ™ Resole Phenolic Resin | DUREZ Corp, Dallas, TX | 11.06 |
| LUBA-PRINT 887/C ™ Wax Dispersion/Lubricant | L. P. Bader & Co., GmbH, Rottweil, Germany | 1.28 |
| Xylene Over-coat Carrier Liquid | Sigma-Aldrich Chemical Co., St. Louis, MO | 1.44 |
| Ethyl Acetate ™ Over-coat Carrier Liquid | Sigma-Aldrich Chemical Co., St. Louis, MO | 0.51 |

TABLE VIII-continued

Preparation of Exemplary Over-coat Coating Composition

| Raw Material | Raw Material Available From | Example 18 (% w/w) |
|---|---|---|
| TINSTAB OTS 17 MS ™ Hydrogen Chloride Scavenger | AKZO-Nobel Chemicals, Inc., Chicago, IL | 1.05 |
| Aluminum sec-Butoxide Catalyst | AKZO-Nobel Chemicals, Inc., Chicago, IL | 0.62 |

Example 19-22

Substrates Coated with Inventive Coating Compositions

To demonstrate the usefulness of a coating composition of the present invention, an exemplary two-coat BPA, BPF, BADGE and BFDGE-free coating composition described above was applied to sheets of tin-plated steel (electroplated tin plate, ETP).

In Example 19, the under-coat of Example 13 was applied to the metal substrate using a #12 wire-wound applicator rod at a targeted cured coating weight of 6.2 g/m$^2$, then baked (stoved) for ten minutes at about 204° C. to effect curing. The over-coat of Example 16 was then applied to the cured under-coated metal substrate using a #14 wire-wound applicator rod at a targeted cured coating weight of 11.6 g/m$^2$, then baked (stoved) for ten minutes at about 204° C. to effect curing.

In Example 20, the under-coat of Example 13 was applied to the metal substrate using a #12 wire-wound applicator rod at a targeted cured coating weight of 6.4 g/m$^2$, then baked (stoved) for ten minutes at about 204° C. to effect curing. The over-coat of Example 17 was then applied to the cured under-coated metal substrate using a #14 wire-wound applicator rod at a targeted cured coating weight of 11.6 g/m$^2$, then baked (stoved) for ten minutes at about 204° C. to effect curing.

The cured coated sheets from Examples 19 and 20 were then evaluated for flexibility by stamping 206 easy-open food can ends and by drawing 202×200 food cans.

In Example 21, the exemplary blended two polyester (co)polymer under-coat coating composition of Example 14 was applied as a base-coat or primer to electrolytic tin plate (ETP) scrolled sheets in an amount sufficient to provide about 7 g/m$^2$ on a dry weight basis, then stoved (cured) for about ten minutes (oven dwell time) at an oven temperature of about 200° C. (peak oven temperature) for about 12 minutes (oven dwell time) to provide an adherent, cross-linked, cured over-coat composition on the under-coat composition covering the metal substrate. The exemplary over-coat coating composition of Example 18 was then applied as a top-coat or lacquer over the cured under-coat primer layer at approximately 14 g/m$^2$ (dry film weight) and baked at an oven temperature of about 190° C. (peak oven temperature) for about ten minutes (oven dwell time). The coated and cured multi-coat scrolled sheets of Example 21 were processed into 65 mm diameter "easy-open" end closures.

In Example 22, the exemplary single polyester resin under-coat coating composition of Example 15 was applied as a base-coat or primer to tin-free steel (TFS) scrolled sheets in an amount sufficient to provide 8 g/m$^2$ (dry film weight) of cured coating composition on the scrolled surface, then stoved for about 12 minutes (oven dwell time) at about 200° C. (peak oven temperature) to provide an adherent, cross-linked, cured coating composition on the metal substrate. The exemplary over-coat coating composition of Example 18 was then applied as a top-coat or lacquer over the cured under-coat primer layer at approximately 12 g/m$^2$ (dry film weight) and baked at an oven temperature of about 190° C. (peak oven temperature) for about ten minutes (oven dwell time). The coated and cured multi-coat scrolled sheets were processed into 83 mm diameter "easy-open" end closures.

(Comparative) Example 23-25

Substrates Coated with Control Compositions

Example 23 is a commercial two-coat epoxy-based "gold lacquer" composition that includes an under-coat primer containing a combination of an epoxy (co)polymer and a phenolic (co)polymer and a top-coat lacquer containing a combination of a polyvinyl chloride organosol, a phenolic (co)polymer and a NOGE/epoxidized linseed oil (ELO) PVC stabilizer (available from the Valspar Corp., Pittsburgh, Pa.). The control gold lacquer composition of Example 23 was applied to electrolytic tin plate (ETP) scrolled sheets at approximately 6.2 g/m$^2$ for the under-coat and 11.6 g/m$^2$ for the over-coat.

Examples 24-25 tare two different commercially available three-coat epoxy "gold lacquer" control compositions prepared using an under-coat primer containing a combination of an epoxy resin and a phenolic resin and two layers of a top-coat lacquer containing a combination of a polyvinyl chloride organosol, a phenolic resin and a NOGE/epoxidized soybean oil (ESBO) stabilizer. The under-coat primer of each of Examples 24-25 was applied at approximately 4-5 g/m$^2$, and the over-coat lacquer was applied in two passes at approximately 12 g/m$^2$ per pass (Example 24) or 8 g/m$^2$ per pass (Example 25). The control compositions of Examples 24-25 were applied to electrolytic tin plate scrolled sheets and stoved to provide a cured protective coating used for fabricating food storage containers and 65 mm diameter "easy-open" end closures.

Evaluation of Metal Substrates Coated with Coating Compositions

The inventive multi-coat system coated metal substrates were tested, comparatively to the control compositions of Examples 23-25, for use in fabricating foodstuffs storage containers and particularly metal closures for food or beverage containers. In addition to the extent of cure of the coatings and their visual aesthetic appearance when coated on the metal substrates, other important characteristics of the cured coating compositions of the present invention preferably include: (1) providing a coating capable of adhering to the metal substrate, (2) providing a coating that exhibits excellent flexibility, and (3) enhancing corrosion inhibition of the metal substrate, particularly under sterilization or pasteurization conditions.

Accordingly, the cured coatings of Examples 19-25 were tested for adhesion to the metal substrate, for flexibility, for ability to inhibit corrosion of the metal substrate and for chemical resistance to model foodstuffs and sterilization conditions. The following test methods are offered to aid in understanding of the present invention and are not to be construed as limiting the scope thereof. The coated composite metal substrates and multi-part food container components described above were evaluated by tests as follows:

Cured Film Performance

Coating Uniformity/Porosity

This test method determines the amount of metal substrate surface that has not been effectively coated by the protective coating. The extent of metal exposure for metal substrates (e.g. cans or ends) was determined using a WACO enamel rater (Wilkens-Anderson Co., Chicago, Ill.) in 4-second mode using an electrolyte solution consisting of 989.7 grams deionized water, 10 g sodium chloride (NaCl) and 0.3 g Aerosol OT-B (available from CYTEC Industries, West Paterson, N.J.).

If any uncoated metal is present on the surface of the metal substrate, then a current is passed between these two probes and registers as a value on an LED display. The LED displays the conveyed currents in milliamps, or more commonly referred to as 'mAs'. The current that is passed is directly proportional to the amount of metal that has not been effectively covered with coating. The goal is to achieve 100% coating coverage on the metal substrate, which would result in an LED reading of 0.0 mAs.

Cross-Hatch Adhesion

To assess adhesion, cans and can end closures were subjected to a variety of tests to determine the adhesion of the coating to the metal substrate, including, for example, the cross hatch adhesion test.

For Examples 19-20 and Comparative Example 23 only, cross-hatch adhesion tests were performed according to ASTM Test Method D 3359—Test Method B. In the cross-hatch adhesion test, the headspace region of the can or the can end is 'cross-hatched' in a 'tic tac toe-like' pattern with a sharp object. Once this crosshatch pattern is made this region is investigated with Scotch® #610 tape (3M Company, St. Paul. Minn.) to assess the ability of the coating to maintain adhesion in this area. The adhesion rating scale is 0-10, with '10' meaning that 100% of the coating in this area has maintained adhesion, a '9' meaning that 90% of the coating remains in the tested area, and so on. A '0' is assigned when 100% of the coating in this region is removed by the tape. The adhesion rating reported is an average rating for three cans or three can ends.

For Example 21 and Comparative Example 24 only, cross-hatch adhesion tests were performed generally according to ASTM Test Method D 3359—Test Method B. However, the adhesion rating scale for these two examples is "A-E", with 'A' meaning that 100% of the coating in this area has maintained adhesion, and "E" meaning that 100% of the coating has been removed from the tested area, and so on. A "+" or "-" indicator indicates a rating intermediate between to ratings. Thus, an "A-" and "B+" rating are equivalent, and indicate a rating between "A" and "B", and so on.

Cured Film Corrosion Resistance

To evaluate corrosion resistance of the cured films, cans and can ends were sterilized against various food simulants for about 60 minutes at 121° C. and 15 pounds per square inch (about 1 atmosphere) pressure unless stated otherwise. These food simulants include:
  Tap water;
  Deionized water;
  1 and 2% w/w lactic acid in deionized water;
  1 and 3% w/w NaCl in tap water;
  2% w/w citric acid in tap water;
  1% w/w citric acid/1% w/w NaCl in tap water;
  1.5% w/w lactic acid/2% w/w NaCl in tap water;
  1, 2 and 3% w/w NaCl/citric/lactic acid in tap water;
  3% w/w acetic acid
  3% w/w acetic acid/2% w/w NaCl
  Peas (250 grams (g) frozen peas, 0.5 g cysteine hydrochloride monohydrate, 0.25 g sodium carbonate, and 500 g water)
Peas were pre-heated to 71° C. prior to the filling and closure of the can. After retorting, the container and its contents were then frozen.

Coating Test Results

Coated Metal Food Cans

As shown in Table IX, the inventive BPA, BPF, BADGE and BFDGE-free two-coat coating compositions of Examples 19-20, when applied as a thin protective coating, were of comparable performance to the commercial two-coat "gold lacquer" controls coatings of Example 23 with respect to flexibility and with respect to adhesion and flexibility after sterilization. The commercial "gold lacquer" uses an epoxy-based under-coat and a PVC-based over-coat. All coatings in Table IX were prepared at the same dried film coating weights.

As demonstrated in Table IX, a coating composition of the present invention, after curing, exhibited comparable chemical and corrosion resistance when compared to the commercial two-coat epoxy "gold lacquer." The exemplary inventive coating composition also provides a cured coating composition that exhibits excellent flexibility. Flexibility is an important property of a cured coating composition because the metal substrate is typically coated with the protective coating prior to stamping or otherwise shaping the metal substrate into a desired metal article, such as a metal container or a metal end closure for a multi-part metal foodstuffs storage container.

The coated metal substrate undergoes severe deformations during the shaping process, and if a cured coating composition lacks sufficient flexibility, the coating can form cracks, or fractures. Such cracks result in corrosion of the metal substrate because the aqueous contents of the container have greater access to the metal substrate. In addition, a cured coating composition provided by a composition of the present invention is sufficiently adhered to the substrate during processing into a metal article, thereby further enhancing processability and corrosion inhibition.

TABLE IX

Evaluation of Coated Metal Food Cans (202 × 202)

| TEST | Example 19 (Non-Pigmented) | Example 20 (Pigmented) | Example 23 (Comparative) |
|---|---|---|---|
| Under-coat Composition | Example 13 | Example 13 | Epoxy-phenolic |
| Dry Coating Weight (g/m$^2$) | 6.2 | 6.4 | 6.2 |

TABLE IX-continued

Evaluation of Coated Metal Food Cans (202 × 202)

| TEST | Example 19 (Non-Pigmented) | Example 20 (Pigmented) | Example 23 (Comparative) |
|---|---|---|---|
| Over-coat Composition | Example 16 | Example 17 | PVC-phenolic-NOGE/ELO |
| Dry Coating Weight (g/m$^2$) Initial | 11.6 | 11.6 | 11.6 |
| Dry Adhesion | 10 | 10 | 10 |
| Metal Exposure (mA) After Deionized Water Retort | 0 | 1 | 1 |
| Adhesion | 10 | 10 | 10 |
| Metal Exposure (mA) | 0 | 1 | 1 |
| Blush | None | None | None |
| Corrosion/Blisters After Lactic Acid Retort | None | None | None |
| Adhesion | 10 | 10 | 10 |
| Metal Exposure (mA) | 1 | 1 | 1 |
| Blush | None | Slight | Slight |
| Corrosion/Blisters After Salt/Acetic Acid Retort | None | None | Slight |
| Adhesion | 10 | 10 | 10 |
| Metal Exposure (mA) | 2 | 2 | 2 |
| Blush | None | Slight | Slight |
| Corrosion/Blisters | None | None | Moderate |

Coated Metal Scrolls

The present invention also provides a method of coating the multi-coat BPA, BPF, BADGE and BFDGE-free coating composition to a metal substrate such as a metal scroll used in a coil coating process. The exemplary inventive two-coat composition of Example 21 was applied in a two-pass roll coating operation to electrolytic tin plate at a rate of 15-23 grams of total cured coating composition per square meter of coated substrate surface (i.e. application of 6-8 g/m$^2$ of the under-coat composition coated on the metal substrate as a primer, followed by stoving of the under-coat composition, followed by application of 9-15 g/m$^2$ of the over-coat composition coated on the cured under-coat composition on the metal substrate, followed by stoving of the multi-coat system). Stoving was effected at a time and temperature sufficient to provide an adherent, cross-linked multi-coat protective coating, generally 7-15 minutes at 180-210° C.

As shown in Table X, the inventive BPA, BPF, BADGE and BFDGE-free two-coat coating compositions of Example 21 are equivalent in performance to the three-coat epoxy-based "gold lacquer" control coatings of Example 24 with respect to porosity, cross-hatch adhesion and appearance after sterilization. The inventive coating system may also be sufficiently well-adhered to the metal substrate to facilitate processing of the coated metal scroll into a metal foodstuffs container without delamination or failure of the coating, thereby enhancing processability and corrosion resistance.

The inventive BPA, BPF, BADGE and BFDGE-free two-coat coating composition of Example 21 is superior in performance with respect to storage of simulated acidic foodstuffs when compared to the comparative three-coat epoxy gold lacquer control. The present coating compositions pass cross-hatch adhesion tests in a variety of chemical environments simulating exposure to foodstuffs, and performs particularly well compared to the comparative commercial gold lacquers, particularly under acidic conditions.

Thus, the exemplary inventive two-layer coating compositions may provide superior citric acid, lactic acid and acetic acid resistance over the corresponding three-layer gold lacquer control.

TABLE X

Evaluation of Coated 65 mm ETP Easy Open End Closures

| TEST | Example 21 (Two-Coat) | Example 24 (Comparative Three-Coat) |
|---|---|---|
| Under-coat Composition | Example 14 | Epoxy-phenolic |
| Dry Coating Weight (g/m$^2$) | 8 | 4-5 |
| Over-coat Composition | Example 18 | PVC-phenolic-NOGE/ESBO |
| Dry Coating Weight (g/m$^2$) | 12 | 12 |
| Third-coat Composition | N/A | Same as Over-coat |
| Dry Coating Weight (g/m$^2$) | N/A | 12 |
| Coating Uniformity Initial Porosity | | |
| Before retort | 1.3 mA | 2.5 mA |
| After retort in 3% salt | 2.6 mA | 2.9 mA |
| Porosity after Added Cure (10 minutes @ 200° C.) | | |
| Before retort | 1.8 mA | 0.5 mA |
| After retort in 3% salt | 1.6 mA | 1.6 mA |
| *Headspace Corrosion-resistance Blush/Cross-hatch Adhesion | | |
| Tap water | Strong Blush/A– | Strong Blush/A |
| 3% NaCl in water | OK/B | Slight Blush/A |
| NaCl/citric/lactic acid | OK/A | OK/D– |
| NaCl/acetic acid | OK/A | Rough/C+ |
| Frozen peas | Blush, Slight Stain/A– | Strong Blush, Stain/A |

*Easy open end closures were sealed to an upright can filled with the indicated test substance.

The exemplary inventive coating composition also preferably provides a cured coating composition that exhibits excellent flexibility. Flexibility is an important property of a cured coating composition because the metal substrate is typically coated with the protective coating prior to stamping or otherwise shaping the metal substrate into a desired metal article.

The coated metal substrate undergoes severe deformations during the shaping process, and if a cured coating composition lacks sufficient flexibility, the coating can form cracks, or fractures. Such cracks result in corrosion of the metal substrate because the aqueous contents of the container or bottle have greater access to the metal substrate.

The above-described advantages make a coating composition of the present invention useful for application on the interior surface of a variety of metal articles, such as for the interior of vacuum-packed metal containers. However, the present coating composition may also be useful, after curing, as a corrosion-inhibiting coating on "easy-open" metal end closures for multi-part foodstuffs storage containers, particularly containers for vacuum-packed foodstuffs.

Easy-Open End Closures

The exemplary inventive compositions of Examples 19, 20 and 22 were evaluated on tinplate for use on easy-open end closures. Easy-open end closures require cured coatings exhibiting high flexibility and sterilization resistance, as well as processing performance that passes the normal tests such as drawn can fabrication. The suitability of the exemplary inventive coating composition as a protective coating system for "easy-open" end closures for multi-part metal foodstuffs containers was also evaluated.

"Easy-open" metal foodstuffs container end closures were fabricated by coating either the exemplary inventive multi-coat coating system of Example 22 or the control 3-coat "gold lacquer" of (Comparative) Example 25 onto commercially available aluminum can end stock using a wire wound bar to obtain a dry coating thickness of 7.5 g/m². The coated panels were then baked in a simulated coil line oven for 11 seconds to a peak metal temperature of about 232° C. for approximately one second.

The exemplary inventive multi-coat coating system of Example 22 and the control three-coat "gold lacquer" of (Comparative) Example 25 were coated onto TFS panels and fabricated into metal closures. The closures were subjected to accelerated corrosion testing as previously described; the test results are summarized in Table XI.

In addition, the inventive two-coat hardenable composition of Examples 19 and 20, along with the comparative two-coat "gold lacquer" control compositions of (Comparative) Example 23, were coated onto tin plate panels and fabricated into "easy open" metal food closures as previously described. The closures were subjected to accelerated corrosion testing as previously described; the test results are summarized in Table XII.

Tables XI and XII show that the exemplary inventive two-coat composition passed fabrication of the closures, integrity requirements at elevated temperatures, and compound adhesion tests. In all tests, the inventive composition performed better than or equal to the control three-coat epoxy gold lacquer composition.

TABLE XI

Evaluation of Coated 83 mm TFS Easy-open End Closures

| TEST | Example 22 Two-Coat | Example 25 (Comparative) Three-Coat |
|---|---|---|
| Under-coat Composition | Example 14 | Epoxy-phenolic |
| Dry Coating Weight (g/m²) | 8 | 4-5 |
| Over-coat Composition | Example 18 | PVC-phenolic-NOGE/ESBO |
| Dry Coating Weight (g/m²) | 12 | 8 |
| Third-coat Composition | N/A | Same as Over-coat |
| Dry Coating Weight (g/m²) | N/A | 8 |
| Sterilization-resistance Porosity | | |
| Before Retort After Sterilization (1 Hour @ 131° C.): | 1.1 mA | 0.2 mA |
| Deionized water | 0.5 mA | 0.8 mA |
| 1% NaCl | 2.3 mA | 1.0 mA |
| 1% Citric acid/1% NaCl | 2.1 mA | 1.4 mA |
| 2% Citric acid | 1.3 mA | 3.4 mA |
| 1.5% Lactic acid/2% NaCl | 1.7 mA | 3.2 mA |
| 2% Lactic acid | 2.7 mA | 1.6 mA |
| 3% Acetic acid/2% NaCl | 1.1 mA | 2.5 mA |
| 3% Acetic acid | 1.4 mA | 1.2 mA |

TABLE XII

Evaluation of Coated Metal Easy-open End Closures (206)

| TEST | Example 19 (Non-Pigmented) | Example 20 (Pigmented) | Example 23 (Comparative) |
|---|---|---|---|
| Under-coat Composition | Example 13 | Example 13 | Epoxy-phenolic |
| Dry Coating Weight (g/m²) | 6.2 | 6.4 | 6.2 |
| Over-coat Composition | Example 16 | Example 17 | PVC-phenolic-NOGE/ELO |
| Dry Coating Weight (g/m²) Initial | 11.6 | 11.6 | 11.6 |
| Dry Adhesion | 10 | 10 | 10 |
| Metal Exposure (mA) After Water Retort | 0 | 0 | 0 |
| Adhesion | 10 | 10 | 10 |
| Metal Exposure (mA) | 0 | 1 | 1 |
| Blush | None | None | None |
| Corrosion/Blisters After Lactic Acid Retort | None | None | None |
| Adhesion | 10 | 10 | 10 |
| Metal Exposure (mA) | 1 | 2 | 6 |
| Blush | None | Slight | Slight |
| Corrosion/Blisters After Salt/Acetic Acid Retort | None | None | Slight |
| Adhesion | 10 | 10 | 10 |
| Metal Exposure (mA) | 2 | 2 | 3 |
| Blush | None | Slight | Slight |
| Corrosion/Blisters | None | None | Moderate |

The above specification, examples and data provide a written description of the BPA, BPF, BADGE and BFDGE-free, hardenable coating compositions of the present invention, as well as the methods of making and methods of using the metal substrate coating system to produce metal foodstuffs storage containers according to the present invention. Various preferred embodiments of the invention were also described. These and other embodiments of the invention reside within the scope of the following claims.

We claim:

1. A metal closure for a food or beverage container, the metal closure comprising:
   a metal substrate;
   a multi-layer food-contact coating adhered to an interior surface of the metal substrate, the coating comprising:
      an under-coat layer formed from an under-coat composition comprising:
         a polyester (co)polymer, and
         an under-coat cross-linker; and
      an over-coat layer formed from an over-coat composition comprising finely divided poly(vinyl chloride) (co)polymer particles dispersed in a substantially nonaqueous carrier liquid to form an organosol, wherein the over-coat composition includes from about 40 to about 90 percent by weight, on a non-volatile solids basis, of the poly(vinyl chloride) (co)polymer;
   wherein the over-coat and under-coat layers are completely free of BPA, BPF, BADGE and BFDGE.

2. The metal closure of claim 1, wherein the under-coat cross-linker comprises a phenolic cross-linker.

3. The metal closure of claim 2, wherein the phenolic cross-linker is a resole type phenolic cross-linker.

4. The metal closure of claim 1, wherein the under-coat composition includes from about 20 to about 99 percent by weight, on a non-volatile solids basis, of the polyester (co)polymer.

5. The metal closure of claim 4, wherein the under-coat composition includes from about 5 to about 30 percent by weight of phenolic cross-linker, based on the total non-volatile solids in the under-coat composition.

6. The metal closure of claim 1, wherein the under-coat composition includes from about 60 to about 99 percent by weight, on a non-volatile solids basis, of the polyester (co)polymer.

7. The metal closure of claim 4, wherein the polyester (co)polymer exhibits a glass transition temperature of greater than 50° C.

8. The metal closure of claim 1, wherein the polyester (co)polymer exhibits a glass transition temperature of greater than 60° C.

9. The metal closure of claim 1, wherein the coating is completely free of NOGE.

10. The metal closure of claim 1, wherein the coating is an aromatic glycidyl ether-free coating.

11. The metal closure of claim 1, wherein the coating is a two-layer coating.

12. A food or beverage container including the metal closure of claim 1, wherein the container contains a packaged food or beverage product.

13. A metal closure for a food or beverage container, comprising:
   a metal substrate;
   a two-layer food-contact coating adhered to an interior surface of the metal substrate, the multi-layer coating comprising:
      an under-coat layer formed from an under-coat composition comprising:
         from about 20 to about 99 percent by weight, on a non-volatile solids basis, of a polyester (co)polymer, and
         from about 5 to about 30 percent by weight, on a non-volatile solids basis, of a phenolic cross-linker; and
      an over-coat layer formed from an over-coat composition comprising finely divided poly(vinyl chloride) (co)polymer particles dispersed in a substantially nonaqueous carrier liquid to form an organosol, wherein the over-coat composition includes from about 40 to about 90 percent by weight, on a non-volatile solids basis, of the poly(vinyl chloride) (co)polymer;
   wherein the coating is completely free of BPA, BPF, BADGE, BFDGE, and NOGE.

14. The metal closure of claim 13, wherein the polyester (co)polymer exhibits a glass transition temperature of greater than 50° C.

* * * * *